United States Patent
Hao et al.

(10) Patent No.: US 11,435,616 B2
(45) Date of Patent: Sep. 6, 2022

(54) OPTICAL CONSTRUCTION AND DISPLAY SYSTEM INCORPORATING SAME

(71) Applicant: 3M INNOVATIVE PROPERTIES COMPANY, St. Paul, MN (US)

(72) Inventors: Encai Hao, Woodbury, MN (US); Fei Lu, Cupertino, CA (US); William Blake Kolb, West Lakeland, MN (US); Brian W. Ostlie, Hudson, WI (US); Adam D. Haag, Woodbury, MN (US); Michael Benton Free, St. Paul, MN (US); William D. Coggio, Hudson, WI (US); Michael L. Steiner, New Richmond, WI (US); Soemantri Widagdo, Mendota Heights, MN (US); Kui Chen-Ho, Woodbury, MN (US); Lan H. Liu, Rosemount, MN (US); Robert F. Kamrath, Mahtomedi, MN (US); Scott M. Tapio, Falcon Heights, MN (US); John A. Wheatley, Lake Elmo, MN (US); Charles D. Hoyle, Stillwater, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 332 days.

(21) Appl. No.: 16/840,694

(22) Filed: Apr. 6, 2020

(65) Prior Publication Data
US 2020/0233268 A1    Jul. 23, 2020

Related U.S. Application Data

(60) Continuation of application No. 14/865,892, filed on Sep. 25, 2015, now Pat. No. 10,649,274, which is a
(Continued)

(51) Int. Cl.
*G02B 5/02* (2006.01)
*G02F 1/13357* (2006.01)
(Continued)

(52) U.S. Cl.
CPC ......... *G02F 1/133606* (2013.01); *G02B 5/02* (2013.01); *G02B 5/3041* (2013.01);
(Continued)

(58) Field of Classification Search
CPC ......... G02F 1/133536; G02F 1/133606; G02F 1/1336; G02F 1/133602; G02B 5/02;
(Continued)

(56) References Cited

U.S. PATENT DOCUMENTS 3,712,706 A    1/1973    Stamm
3,924,929 A    12/1975    Holmen
(Continued)

FOREIGN PATENT DOCUMENTS

EP    0142250    5/1985
EP    1450202    8/2004
(Continued)

OTHER PUBLICATIONS

ASTM Designation: D 1003-00, "Standard Test Method for Haze and Luminous Transmittance of Transparent Plastics", 2000, pp. 1-6.
(Continued)

*Primary Examiner* — William R Alexander

(57) ABSTRACT

Optical constructions are disclosed. A disclosed optical construction includes a reflective polarizer layer, and an optical film that is disposed on the reflective polarizer layer. The optical film has an optical haze that is not less than about 50%. Substantial portions of each two neighboring major surfaces in the optical construction are in physical contact
(Continued)

with each other. The optical construction has an axial luminance gain that is not less than about 1.2.

18 Claims, 12 Drawing Sheets

Related U.S. Application Data division of application No. 13/264,281, filed as application No. PCT/US2010/031149 on Apr. 15, 2010, now abandoned.

(60) Provisional application No. 61/169,521, filed on Apr. 15, 2009.

(51) Int. Cl.
*G02B 5/30* (2006.01)
*G02F 1/1335* (2006.01)
*F21V 8/00* (2006.01)

(52) U.S. Cl.
CPC ......... *G02B 5/3058* (2013.01); *G02B 5/3083* (2013.01); *G02B 6/0056* (2013.01); *G02F 1/133536* (2013.01)

(58) Field of Classification Search
CPC .. G02B 5/3041; G02B 5/3058; G02B 5/3083; G02B 6/0056; G02B 6/0033; G02B 6/0011
USPC .................................................... 359/485.05
See application file for complete search history.

(56) References Cited

U.S. PATENT DOCUMENTS

| | | |
|---|---|---|
| 4,025,159 A | 5/1977 | McGrath |
| 4,127,693 A | 11/1978 | Lemelson |
| 4,202,600 A | 5/1980 | Burke |
| 4,243,618 A | 1/1981 | Van Arnam |
| 4,478,769 A | 10/1984 | Pricone |
| 4,539,256 A | 9/1985 | Shipman |
| 4,588,258 A | 5/1986 | Hoopman |
| 4,618,518 A | 10/1986 | Pricone |
| 4,656,072 A | 4/1987 | Coburn, Jr. |
| 4,672,089 A | 6/1987 | Pricone |
| 4,726,706 A | 2/1988 | Attar |
| 4,726,989 A | 2/1988 | Mrozinski |
| 4,775,219 A | 10/1988 | Appledorn |
| 4,801,193 A | 1/1989 | Martin |
| 4,906,070 A | 3/1990 | Cobb, Jr. |
| 5,056,892 A | 10/1991 | Cobb, Jr. |
| 5,120,594 A | 6/1992 | Mrozinski |
| 5,156,863 A | 10/1992 | Pricone |
| 5,229,882 A | 7/1993 | Rowland |
| 5,238,623 A | 8/1993 | Mrozinski |
| 5,528,720 A | 6/1996 | Winston |
| 5,614,286 A | 3/1997 | Bacon, Jr |
| 5,691,846 A | 11/1997 | Benson, Jr. |
| 5,711,589 A | 1/1998 | Oe |
| 5,743,981 A | 4/1998 | Lu |
| 5,759,468 A | 6/1998 | Smith |
| 5,804,610 A | 9/1998 | Hamer |
| 5,808,713 A | 9/1998 | Broer |
| 5,831,766 A | 11/1998 | Martin |
| 5,882,796 A | 3/1999 | Wilson |
| 5,919,555 A | 7/1999 | Yasuda |
| 5,930,041 A | 7/1999 | Thielman |
| 5,946,134 A | 8/1999 | Benson |
| 5,959,774 A | 9/1999 | Benson |
| 5,992,066 A | 11/1999 | Brauer |
| 5,993,954 A | 11/1999 | Radovanovic |
| 6,004,422 A | 12/1999 | Janovec |
| 6,090,861 A | 7/2000 | Mendenhall |
| 6,132,861 A | 10/2000 | Kang |
| 6,139,158 A | 10/2000 | Nilsen |
| 6,166,855 A | 12/2000 | Ikeyama |
| 6,204,202 B1 | 3/2001 | Leung |
| 6,210,858 B1 | 4/2001 | Yasuda |
| 6,224,223 B1 | 5/2001 | Higuchi |
| 6,224,792 B1 | 5/2001 | Janovec |
| 6,231,797 B1 | 5/2001 | Bernard |
| 6,254,675 B1 | 7/2001 | Aldinger |
| 6,285,001 B1 | 9/2001 | Fleming |
| 6,325,515 B1 | 12/2001 | Coderre |
| 6,350,035 B1 | 2/2002 | Smith |
| 6,355,759 B1 | 3/2002 | Sherman |
| 6,368,699 B1 | 4/2002 | Gilbert |
| 6,376,590 B2 | 4/2002 | Kolb |
| 6,383,559 B1 | 5/2002 | Nakamura |
| 6,457,823 B1 | 10/2002 | Cleary |
| 6,461,724 B1 | 10/2002 | Radovanovic |
| 6,573,305 B1 | 6/2003 | Thunhorst |
| 6,656,571 B2 | 12/2003 | Benson |
| 6,677,028 B1 | 1/2004 | Lasch |
| 6,703,463 B2 | 3/2004 | Holguin |
| 6,719,426 B2 | 4/2004 | Magarill |
| 6,843,571 B2 | 1/2005 | Sewall |
| 6,846,089 B2 | 1/2005 | Stevenson |
| 6,884,371 B2 | 4/2005 | Smith |
| 6,890,642 B2 | 5/2005 | Kaminsky |
| 6,899,944 B2 | 5/2005 | Tanaka |
| 6,917,400 B2 | 7/2005 | Nakamura |
| 6,958,860 B2 | 10/2005 | Dontula |
| 6,967,053 B1 | 11/2005 | Mullen |
| 6,984,429 B2 | 1/2006 | Thunhorst |
| 7,027,671 B2 | 4/2006 | Huck |
| 7,068,910 B2 | 6/2006 | Duine |
| 7,072,544 B2 | 7/2006 | Cornelissen |
| 7,132,136 B2 | 11/2006 | Laney |
| 7,157,839 B2 | 1/2007 | Ouderkirk |
| 7,195,360 B2 | 3/2007 | Bacon, Jr. |
| 7,204,616 B2 | 4/2007 | Kitamura |
| 7,251,079 B2 | 7/2007 | Capaldo |
| 7,261,424 B2 | 8/2007 | Smith |
| 7,293,884 B2 | 11/2007 | Sawayama |
| 7,309,135 B2 | 12/2007 | Smith |
| 7,327,415 B2 | 2/2008 | Brickey |
| 7,347,571 B2 | 3/2008 | Bacon, Jr. |
| 7,372,075 B2 | 5/2008 | Shigemura |
| 7,422,334 B2 | 9/2008 | Smith |
| 7,466,373 B2 | 12/2008 | Xu |
| 7,547,105 B2 | 6/2009 | Bacon, Jr. |
| 7,611,251 B2 | 11/2009 | Thakkar |
| 7,980,710 B2 | 7/2011 | Hayashi |
| 8,982,468 B2 | 3/2015 | Petaja |
| 9,279,918 B2 | 3/2016 | Haag |
| 2001/0022997 A1* | 9/2001 | Honda .............. G02F 1/133536 428/1.31 |
| 2002/0012085 A1 | 1/2002 | Honda |
| 2002/0034457 A1 | 3/2002 | Reichert |
| 2002/0061178 A1 | 5/2002 | Winston |
| 2003/0100637 A1 | 5/2003 | Mimura |
| 2003/0118750 A1 | 6/2003 | Bourdelais |
| 2003/0156238 A1* | 8/2003 | Hiraishi ............... G02B 6/0065 349/112 |
| 2003/0170442 A1 | 9/2003 | Kaminsky |
| 2004/0056994 A1 | 3/2004 | Honda |
| 2004/0164325 A1 | 8/2004 | Siegel |
| 2005/0109238 A1 | 5/2005 | Yamaki |
| 2006/0003178 A1 | 1/2006 | Strobel |
| 2006/0019114 A1 | 1/2006 | Thies |
| 2006/0077555 A1 | 4/2006 | Chen |
| 2006/0078696 A1 | 4/2006 | Furholz |
| 2006/0082700 A1 | 4/2006 | Gehlsen |
| 2006/0215079 A1 | 9/2006 | Suzuki |
| 2006/0216455 A1 | 9/2006 | Soaft |
| 2006/0226562 A1 | 10/2006 | Johnson |
| 2006/0246233 A1 | 11/2006 | Fukuda |
| 2006/0275595 A1 | 12/2006 | Thies |
| 2007/0020404 A1 | 1/2007 | Seiberle |
| 2007/0065638 A1 | 3/2007 | Wang |
| 2007/0121211 A1 | 5/2007 | Watanabe |
| 2007/0134438 A1 | 6/2007 | Fabick |

(56) References Cited

U.S. PATENT DOCUMENTS

| | | | |
|---|---|---|---|
| 2007/0139781 A1* | 6/2007 | Inoue | G02B 5/0242 359/613 |
| 2007/0189038 A1 | 8/2007 | Pokorny | |
| 2007/0201246 A1 | 8/2007 | Yeo | |
| 2007/0207307 A1* | 9/2007 | Yoneyama | B32B 27/285 428/313.5 |
| 2008/0002256 A1 | 1/2008 | Sasagawa | |
| 2008/0024870 A1 | 1/2008 | Bourdelais | |
| 2008/0037127 A1 | 2/2008 | Weber | |
| 2008/0043490 A1 | 2/2008 | Coleman | |
| 2008/0064133 A1 | 3/2008 | Lee | |
| 2008/0151375 A1 | 6/2008 | Lin | |
| 2008/0192352 A1 | 8/2008 | Laney | |
| 2008/0214075 A1 | 9/2008 | Marte | |
| 2008/0220554 A1 | 9/2008 | Shigemura | |
| 2008/0248312 A1 | 10/2008 | Thies | |
| 2008/0305282 A1 | 12/2008 | Inakura | |
| 2009/0029145 A1 | 1/2009 | Thies | |
| 2009/0122405 A1 | 5/2009 | Mimura | |
| 2009/0209028 A1 | 8/2009 | Dong | |
| 2010/0103521 A1 | 4/2010 | Smith | |
| 2010/0177397 A1 | 7/2010 | Kamiyama | |
| 2012/0200919 A1 | 8/2012 | Petaja | |
| 2012/0200931 A1 | 8/2012 | Haag | |

FOREIGN PATENT DOCUMENTS

| | | |
|---|---|---|
| EP | 2012157 | 1/2009 |
| EP | 2131218 | 12/2009 |
| GB | 1188736 | 4/1970 |
| GB | 1476447 | 6/1977 |
| GB | 2254826 | 10/1992 |
| JP | 6347621 | 12/1994 |
| JP | 2000-352623 | 12/2000 |
| JP | 2003-201443 A | 7/2003 |
| JP | 2004-079522 | 3/2004 |
| JP | 2004-271568 | 9/2004 |
| JP | 2004-325958 | 11/2004 |
| JP | 2005-266343 | 9/2005 |
| JP | 2005-352121 | 12/2005 |
| JP | 2005-352121 A | 12/2005 |
| JP | 3128397 | 12/2006 |
| JP | 2007-304460 | 11/2007 |
| WO | WO 97-32225 | 9/1997 |
| WO | WO 2004-027474 | 4/2004 |
| WO | WO 2004-104679 | 12/2004 |
| WO | WO 2005-052557 | 6/2005 |
| WO | WO 2006-019666 | 2/2006 |
| WO | WO 2006-022427 | 3/2006 |
| WO | WO 2006-041588 | 4/2006 |
| WO | WO 2006-044292 | 4/2006 |
| WO | WO 2006-044475 | 4/2006 |
| WO | WO 2006-044475 A2 | 4/2006 |
| WO | WO 2006-076320 | 7/2006 |
| WO | WO 2006-096258 | 9/2006 |
| WO | WO 2006-120638 | 11/2006 |
| WO | WO 2006-124588 | 11/2006 |
| WO | WO 2007/067603 | 6/2007 |
| WO | WO 2008-005760 | 1/2008 |
| WO | WO 2008-011919 | 1/2008 |
| WO | WO 2008/042457 | 4/2008 |
| WO | WO 2008-098872 | 8/2008 |
| WO | WO 2008-144136 | 11/2008 |
| WO | WO 2008-144644 | 11/2008 |
| WO | WO 2008-144656 | 11/2008 |
| WO | WO 2010-059566 | 5/2010 |
| WO | WO 2010-059568 | 5/2010 |
| WO | WO 2010-059579 | 5/2010 |
| WO | WO 2010-059614 | 5/2010 |
| WO | WO 2010-120422 | 10/2010 |
| WO | WO 2010-120468 | 10/2010 |
| WO | WO 2010-120845 | 10/2010 |
| WO | WO 2010-120864 | 10/2010 |
| WO | WO 2010-120871 | 10/2010 |
| WO | WO 2010-121019 | 10/2010 |
| WO | WO 2010-121054 | 10/2010 |
| WO | WO 2011-129831 | 10/2011 |
| WO | WO 2011-129832 | 10/2011 |
| WO | WO 2011-129833 | 10/2011 |

OTHER PUBLICATIONS

ASTM D 4956-07, "Standard Specification for Retroreflective Sheeting for Traffic Control" 2007, pp. 504-515.
ASTM E 808-01 (Reapproved 2009), "Standard Practice for Describing Retroreflection", 2001, pp. 1-10.
ASTM E 810-03 (Reapproved 2008) "Standard Test Method for Coefficient of Retroreflection of Retroreflective Sheeting Utilizing the Coplanar Geometry", 2003, pp. 1-8.
Boisvert, "Influence of Structural Properties of Nanoporous Silica-polymer Materials on Ink Absorption", Nordic Pulp and Paper Research Journal, 2003, vol. 18, No. 2, pp. 210-216.
Brunauer, "Adsorption of Gases in Multimolecular Layers", The Bureau of Chemistry and Soils and George Washington University Feb. 1938, vol. 60, pp. 309-319.
Cornelissen, "Efficient and Cost-effective Polarized-light backlights for LCDs", Proceedings of SPIE, vol. 7058, pp. 1-10, (2008).
Groh, "What is the Lowest Refractive Index of an Organic Polymer?", Macromolecules, 1991, vol. 24, No. 25, pp. 6660-6663.
Haze, "Insight on Color", Applications Note, Jun. 2008, vol. 9, No. 6, pp. 1-4.
Ibn-Elhaj, Optical Polymer Thin Films with Isotropic and Anisotropic Nano-corrugated Surface Topologies, Nature, Apr. 12, 2001, vol. 410, pp. 796-799.
Miyamoto, "Control of Refractive Index of Pressure-Sensitive Adhesives for the Optimization of Multilayered Media", Japanese Journal of Applied Physics, vol. 46, pp. 3978-3980, 2007.
Oliveri, "Fabrication and Characterization of Polymeric Optical Waveguides Using Standard Silicon Processing Technology", IEEE Xplore, Jun. 2005, pp. 1-6.
Patton, "Paint Flow and Pigment Dispersion: A Rheological Approach to Coating and Ink Technology", 2nd Edition, pp. 126-180 (1978).
Peng, "Enhanced Coupling of Light from Organic Light Emitting Diodes Using Nanopourous Films", Journal Applied Physics, Aug. 1, 2004, vol. 96, No. 3, pp. 1649-1654.
Polymer Handbook, edited by Bandrup, Immergut, and Grulke, 4th Edition, Parts I-VIII, (1999).
Shen, "Low Dielectric Constant Silica Films with Ordered Nanoporous Structure", Materials Science and Engineering, 2007, C 27, pp. 1145-1148.
Smith, "Driver-focused Design of Retroreflective Sheeting for Traffic Signs", 87th Annual Meeting of Transportation Research Board, pp. 1-17, Jan. 13-17, 2008.
Sudduth, "Modeling Cluster Voids and Pigment Distribution to Predict Properties and CPVC in Coatings", Part 1: Dry Coating Analysis, Pigment and Resin Technology, 2008, vol. 37, No. 6, pp. 375-388.
"Visual Acuity", NDT Resource Center, Iowa State University [online], [retrieved from the internet on Jun. 24, 2011], URL <http://www.ndt.org/EducationResources/CommunityCollege/PenetrantTest/Introduction/visualacuity.htm>, 3 pages.
"Visual Acuity", Wikipedia, [online], [retrieved from the internet on Jun. 24, 2011], URL <http://en.wikipedia.org/wiki/Visual_acuity#Visual_acuity_expression>, 13 pages.
Walheim, "Nanophase-Separated Polymer Films as High-performance Antireflection Coatings", Science, Jan. 22, 1999, vol. 283, pp. 520-522.
Yoder, Jr., "Study of Light Deviation Errors in Triple Mirrors and Tetrahedral Prisms", Journal of Optical Society of America, Jul. 1958, vol. 48, No. 7, pp. 496-499.
Yu, "Comparison of Different Measurement Methods for Transmittance Haze", Metrologia, vol. 46, pp. 233-237, (2009). (XP002603289).

\* cited by examiner

OPTICAL CONSTRUCTION AND DISPLAY SYSTEM INCORPORATING SAME

CROSS REFERENCE TO RELATED APPLICATIONS

This application is a continuation filing of U.S. application Ser. No. 14/865,892, filed Sep. 25, 2015, which is a divisional of U.S. application Ser. No. 13/264,281, filed Oct. 13, 2011, now abandoned, which claims priority to PCT/US2010/031149, filed Apr. 15, 2010, which claims priority to U.S. provisional application 61/169,521, filed Apr. 15, 2009.

RELATED APPLICATIONS

This application is related to the following U.S. Patent Applications which are incorporated by reference: U.S. Publication No. 2012/0038990; U.S. Publication No. 2015/0049384; U.S. Pat. Nos. 8,964,146; 8,891,038; U.S. Publication No. 2012/0021134; and U.S. Pat. No. 8,808,811.

FIELD OF THE INVENTION

This invention generally relates to optical constructions that include a reflective polarizer layer and an optical film that has a low index of refraction, or an optical film that exhibits some low-refractive-index-like properties. The invention is further applicable to display systems, such as liquid crystal display systems, incorporating such optical constructions.

BACKGROUND

Optical displays, such as liquid crystal displays (LCDs), are becoming increasingly commonplace, finding use for example in many applications such as mobile telephones, hand-held computer devices ranging from personal digital assistants (PDAs) to electronic games, to larger devices such as laptop computers, LCD monitors and television screens. LCDs typically include one or more light management films to improved display performance, such as output luminance, illumination uniformity, viewing angle, and overall system efficiency. Exemplary light management films include prismatically structured films, reflective polarizers, absorbing polarizers, and diffuser films.

The light management films are typically stacked between a backlight assembly and a liquid crystal panel. From a manufacturing perspective, several issues can arise from the handling and assembly of several discrete film pieces. These problems include, inter alia, the excess time required to remove protective liners from individual optical films, along with the increased chance of damaging a film when removing the liner. In addition, the insertion of multiple individual sheets to the display frame is time consuming and the stacking of individual films provides further opportunity for the films to be damaged. All of these problems can contribute to diminished overall throughput or to reduced yield, which leads to higher system cost.

SUMMARY OF THE INVENTION

Generally, the present invention relates to optical constructions. In one embodiment, an optical construction includes an optical diffuser layer that has an optical haze that is not less than about 30%, an optical film that is disposed on the optical diffuser layer and has an index of refraction that is not greater than about 1.3 and an optical haze that is not greater than about 5%, and a reflective polarizer layer that is disposed on the optical film. Substantial portions of each two neighboring major surfaces in the optical construction are in physical contact with each other. In some cases, the optical film includes a binder, a plurality of interconnected voids, and a plurality of particles, where the weight ratio of the binder to the plurality of the particles is not less than about 1:2. In some cases, the reflective polarizer layer can be a multilayer optical film that includes alternating layers, where at least one of the alternating layers includes a birefringent material. In some cases, the reflective polarizer layer includes a wire grid reflective polarizer, or a cholesteric reflective polarizer. In some cases, at least 50%, or at least 70%, or at least 90%, of each two neighboring major surfaces in the optical construction are in physical contact with each other. In some cases, the optical construction has an axial luminance gain of no less than about 1.2, or no less than about 1.3, or no less than about 1.4.

In another embodiment, an optical construction includes a reflective polarizer layer, and an optical film that is disposed on the reflective polarizer layer and has an optical haze that is not less than about 50%. Substantial portions of each two neighboring major surfaces in the optical construction are in physical contact with each other. The optical construction has an axial luminance gain that is not less than about 1.2.

In another embodiment, an optical construction includes a reflective polarizer layer, and an optical film that is disposed on the reflective polarizer layer and has a plurality of voids and an optical haze that is not less than about 50%. Substantial portions of each two neighboring major surfaces in the optical construction are in physical contact with each other.

In another embodiment, an optical stack includes an absorbing polarizer layer, an optical film comprising a plurality of voids, and a reflective polarizer layer. Substantial portions of each two neighboring major surfaces in the optical stack are in physical contact with each other. In some cases, the optical film is disposed between the absorbing polarizer layer and the reflective polarizer layer. In some cases, the optical film has an optical haze that is not less than about 50%. In some cases, the optical film has an optical haze that is not greater than about 10%. In some cases, the optical stack further includes an optical diffuser layer that has an optical haze that is not less than about 50%.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

Figure 1:
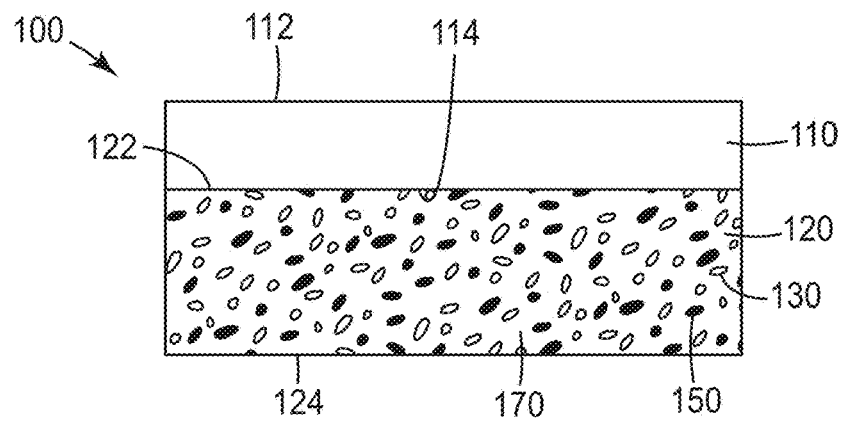
FIG. 1 is a schematic side-view of an optical construction.

This invention generally relates to optical constructions that include a reflective polarizer and an optical film that includes a plurality of voids, such as a plurality of interconnected voids. In some cases, the optical film has a low optical haze and a low effective index of refraction, such as an optical haze of less than about 5% and an effective index of refraction that is less than about 1.3. In some cases, the optical film has a high optical haze and/or high diffuse optical reflectance while exhibiting some low-refractive-index-like optical properties, such as, for example, the ability to support total internal reflection or enhance internal reflection.

The disclosed optical constructions can be incorporated into various optical or display systems such as, for example, a liquid crystal display system, to improve system durability, reduce manufacturing and assembly cost, and reduce the overall thickness of the system while improving, maintaining or substantially maintaining at least some of the system optical properties such as, for example, the on-axis brightness and contrast of an image displayed by the system.

The optical films disclosed herein include a plurality of voids, such as a plurality of interconnected voids or a network of voids, dispersed in a binder. The voids in the plurality of interconnected voids are connected to one another via hollow tunnels or hollow tunnel-like passages. The voids are not necessarily free of all matter and/or particulates. For example, in some cases, a void may include one or more small fiber- or string-like objects that include, for example, a binder and/or nano-particles. Some disclosed optical films include multiple pluralities of interconnected voids or multiple networks of voids where the voids in each plurality or network are interconnected. In some cases, in addition to multiple pluralities of interconnected voids, the disclosed optical films include a plurality of closed or unconnected voids meaning that the voids are not connected to other voids via tunnels.

Some disclosed optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided optical film enhancing internal reflection (EIR), it is meant that the reflectance at the boundary of the voided and non-voided strata of the film or film laminate is greater with the voids than without the voids.

The voids in the disclosed optical films have an index of refraction $n_v$ and a permittivity $\varepsilon_v$, where $n_v^2 = \varepsilon_v$, and the binder has an index of refraction $n_b$ and a permittivity $\varepsilon_b$, where $n_b^2 = \varepsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective permittivity $\varepsilon_{eff}$ and an effective index $n_{eff}$, where $n_{eff}$ can be expressed in terms of the void index $n_v$, the binder index $n_b$, and the film porosity or void volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film can reasonably be assigned an effective index of refraction if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed optical films are sufficiently thick so that the optical film can reasonably have an effective index that can be expressed in terms of the indices of refraction of the voids and the binder, and the void or pore volume fraction or porosity. In such cases, the thickness of the optical film is not less than about 100 nm, or not less than about 200 nm, or not less than about 500 nm, or not less than about 700 nm, or not less than about 1000 nm.

When the voids in a disclosed optical film are sufficiently small and the optical film is sufficiently thick, the optical film has an effective permittivity $\varepsilon_{eff}$ that can be expressed as:

$$\varepsilon_{eff} = f\varepsilon_v + (1-f)\varepsilon_b \qquad (1)$$

In such cases, the effective index $n_{eff}$ of the optical film can be expressed as:

$$n_{eff}^2 = f n_v^2 + (1-f) n_b^2 \quad (2)$$

In some cases, such as when the difference between the indices of refraction of the pores and the binder is sufficiently small, the effective index of the optical film can be approximated by the following expression:

$$n_{eff} = f n_v + (1-f) n_b \quad (3)$$

In such cases, the effective index of the optical film is the volume weighted average of the indices of refraction of the voids and the binder. For example, an optical film that has a void volume fraction of about 50% and a binder that has an index of refraction of about 1.5, has an effective index of about 1.25.

FIG. 1 is a schematic side-view of an optical construction 100 that includes a reflective polarizer layer 110 disposed on an optical film 120 that includes a plurality of voids 130 having an index $n_v$ dispersed in a binder 170 having an index $n_b$. Reflective polarizer layer 110 includes a top major surface 112 and a bottom major surface 114. Optical film 120 includes a top major surface 122 and a bottom major surface 124.

In some cases, the primary optical effect of voids 130 is to affect the effective index and not to, for example, scatter light. In such cases, the optical haze of optical film 120 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the optical film is not greater than about 1.35, or not greater than about 1.3, or not greater than about 1.25, or not greater than about 1.2, or not greater than about 1.15, or not greater than about 1.1, or not greater than about 1.05. In such cases, the thickness of optical film 120 is not less than about 100 nm, or not less than about 200 nm, or not less than about 500 nm, or not less than about 700 nm, or not less than about 1,000 nm, or not less than about 1500 nm, or not less than about 2000 nm.

For light normally incident on optical film 120, optical haze, as used herein, is defined as the ratio of the transmitted light that deviates from the normal direction by more than 4 degrees to the total transmitted light. Haze values disclosed herein were measured using a Haze-guard Plus haze meter (BYK-Gardiner, Silver Springs, Md.) according to the procedure described in ASTM D1003.

In some cases, optical film 120 supports or promote total internal reflection (TIR) or enhance internal reflection meaning that the reflection is greater than what a material with index $n_b$ would produce. In such cases, optical film 120 is sufficiently thick so that the evanescent tail of a light ray that undergoes total internal reflection at a surface of the optical film, does not optically couple, or optically couples very little, across the thickness of the optical film. In such cases, the thickness of optical film 120 is not less than about 1 micron, or not less than about 1.1 micron, or not less than about 1.2 microns, or not less than about 1.3 microns, or not less than about 1.4 microns, or not less than about 1.5 microns, or not less than about 1.7 microns, or not less than about 2 microns. A sufficiently thick optical film 120 can prevent or reduce an undesired optical coupling of the evanescent tail of an optical mode across the thickness of the optical film.

In some cases, optical film 120 has a high optical haze. In such cases, the optical haze of the optical film is not less than about 40%, or not less than about 50%, or not less than about 60%, or not less than about 70%, or not less than about 80%, or not less than about 90%, or not less than about 95%.

In some cases, optical film 120 has a high diffuse optical reflectance. In such cases, the diffuse optical reflectance of the optical film is not less than about 30%, or not less than about 40%, or not less than about 50%, or not less than about 60%.

In some cases, optical film 120 has a high optical clarity. For light normally incident on optical film 120, optical clarity, as used herein, refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-guard Plus haze meter from BYK-Gardiner. In the cases where optical film 120 has a high optical clarity, the clarity is not less than about 40%, or not less than about 50%, or not less than about 60%, or not less than about 70%, or not less than about 80%, or not less than about 90%, or not less than about 95%.

In some cases, optical film 120 has a low optical clarity. In such cases, the optical clarity of the optical film is not greater than about 10%, or not greater than about 7%, or not greater than about 5%, or not greater than about 4%, or not greater than about 3%, or not greater than about 2%, or not greater than about 1%.

In general, optical film 120 can have any porosity or void volume fraction that may be desirable in an application. In some cases, the volume fraction of plurality of voids 130 in optical film 120 is not less than about 20%, or not less than about 30%, or not less than about 40%, or not less than about 50%, or not less than about 60%, or not less than about 70%, or not less than about 80%, or not less than about 90%.

In some cases, optical film 120 also includes a plurality of particles 150 dispersed in binder 170. Particles 150 can have any size that may be desirable in an application. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, plurality of particles 150 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, particles 150 are sufficiently small so that the primary optical effect of the particles is to affect the effective index of optical film 120. For example, in such cases, particles have an average size that is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. As another example, the average particle size is not greater than about 70 nm, or not greater than about 60 nm, or not greater than about 50 nm, or not greater than about 40 nm, or not greater than about 30 nm, or not greater than about 20 nm, or not greater than about 10 nm.

Particles 150 can have any shape that may be desirable or available in an application. For example, particles 150 can have a regular or irregular shape. For example, particles 150 can be approximately spherical. As another example, the particles can be elongated. In such cases, optical film 120 includes a plurality of elongated particles 150. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles can be in the form or shape of a string-of-pearls (such as Snowtex-PS particles available from Nissan Chemical, Houston, Tex.) or aggregated chains of spherical or amorphous particles, such as fumed silica. Particles 150 can be any type particles that may be desirable in an application. For example, particles 150 can be organic or inorganic particles. For example, particles 150 can be silica, zirconium oxide or alumina particles.

Particles 150 may or may not be functionalized. In some cases, particles 150 are not functionalized. In some cases, particles 150 are functionalized so that they can be dispersed in a desired solvent or binder 170 with no, or very little, clumping. In some cases, particles 150 can be further functionalized to chemically bond to binder 170. For example, particles 150 can be surface modified and have reactive functionalities or groups to chemically bond to binder 170. In such cases, at least a significant fraction of particles 150 is chemically bound to the binder. In some cases, particles 150 do not have reactive functionalities to chemically bond to binder 170. In such cases, particles 150 can be physically bound to binder 170.

In some cases, some of the particles have reactive groups and others do not have reactive groups. For example in some cases, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups, or about 55% of the particles have reactive groups and about 45% of the particles do not have reactive groups, or about 60% of the particles have reactive groups and about 40% of the particles do not have reactive groups, or about 65% of the particles have reactive groups and about 35% of the particles do not have reactive groups, or about 70% of the particles have reactive groups and about 30% of the particles do not have reactive groups, or about 75% of the particles have reactive groups and about 25% of the particles do not have reactive groups, or about 80% of the particles have reactive groups and about 20% of the particles do not have reactive groups, or about 85% of the particles have reactive groups and about 15% of the particles do not have reactive groups, or about 90% of the particles have reactive groups and about 10% of the particles do not have reactive groups.

Binder 170 can be or include any material that may be desirable in an application. For example, binder 170 can be a UV curable material that forms a polymer, such as a cross-linked polymer. In some cases, binder 170 can be any polymerizable material, such as a polymerizable material that is radiation-curable.

In general, the weight ratio of binder 170 to plurality of particles 150 can be any ratio that may be desirable in an application. In some cases, the weight ratio of the binder to the plurality of the particles is not less than about 1:1, or not less than about 1.5:1, or not less than about 2:1, or not less than about 2.5:1, or not less than about 3:1, or not less than about 3.5:1, or not less than about 4:1.

In some cases, optical film 120 includes a binder, a fumed metal oxide such as a fumed silica or alumina, and a plurality or network of interconnected voids. In such the weight ratio of the fumed metal oxide to the binder is in a range from about 2:1 to about 6:1, or in a range from about 2:1 to about 4:1. In some cases, the weight ratio of the fumed metal oxide to the binder is not less than about 2:1, or not less than about 3:1. In some cases, the weight ratio of the fumed metal oxide to the binder is not greater than about 8:1, or not greater than about 7:1, or not greater than about 6:1.

Optical film 120 can be any optical film that includes a plurality of voids. For example, optical film 120 can be an optical film described in U.S. Provisional Application No. 61/169466, titled "OPTICAL FILM", the disclosure of which is incorporated in its entirety herein by reference.

Figure 6:
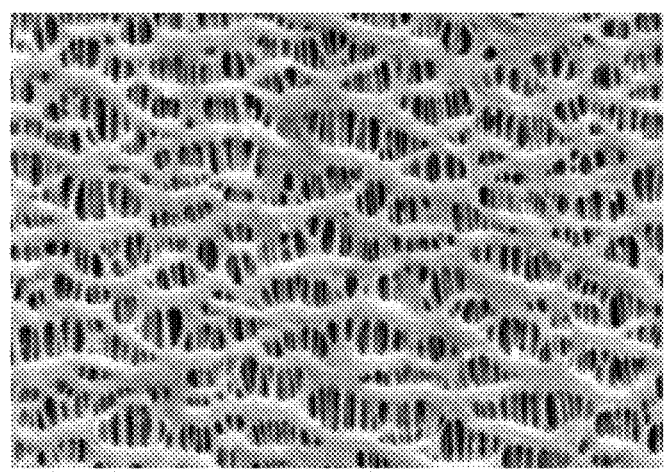
FIG. 6 is an optical image of a porous optical film.

In some cases, optical film 120 can be or include a porous polypropylene and/or polyethylene film such as a CEL-GARD film available from Celanese Separation Products of Charlotte, N.C.). For example, optical film 120 can be or include a CELGARD 2500 film having a thickness of about 25 microns and 55% porosity. As another example, optical film 120 can be or include a CELGARD M824 film having a thickness of about 12 microns and 38% porosity. FIG. 6 is an exemplary optical image of a CELGARD film.

Figure 7:
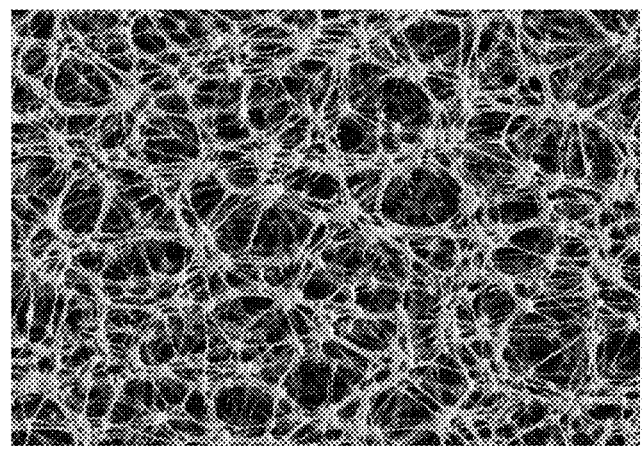
FIG. 7 is an optical image of another porous optical film.

In some cases, optical film 120 can be or include a porous film that is made by thermally induced phase separation (TIPS), such as those made according to the teachings of U.S. Pat. Nos. 4,539,256 and 5,120,594. TIPS films can have a broad range of microscopic pore sizes. FIG. 7 is an exemplary optical image of a TIPS film.

Figure 8:
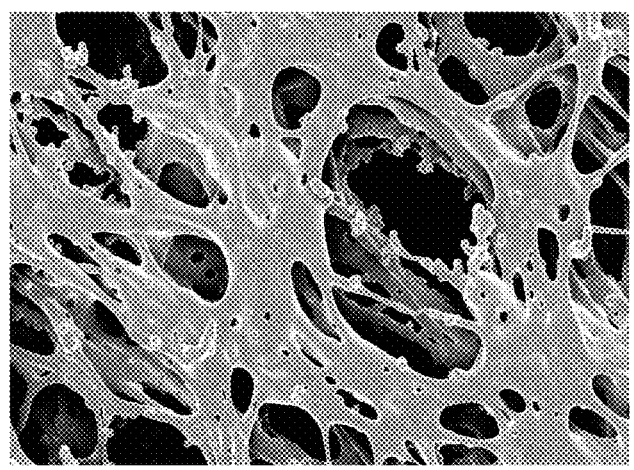
FIG. 8 is an optical image of another porous optical film.

In some cases, optical film 120 can be or include a porous film that is made by solvent induced phase separation (SIPS), an exemplary optical micrograph of which is shown in FIG. 8. In some cases, optical film 120 can be or include a polyvinylidene fluoride (PVDF) porous film.

Optical film 120 can be made using any fabrication method that may be desirable in an application, such as those described in U.S. Pat. No. 8,808,811, and U.S. Publication No. 2012/0021134, the disclosures of which are incorporated in their entirety herein by reference.

Reflective polarizer layer 110 substantially reflects light that has a first polarization state and substantially transmits light that has a second polarization state, where the two polarization states are mutually orthogonal. For example, the average reflectance of reflective polarizer 110 in the visible for the polarization state that is substantially reflected by the reflective polarizer is at least about 50%, or at least about 60%, or at least about 70%, or at least about 80%, or at least about 90%, or at least about 95%. As another example, the average transmittance of reflective polarizer 110 in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 110 substantially reflects light having a first linear polarization state (for example, along the x-direction) and substantially transmits light having a second linear polarization state (for example, along the z-direction).

Any suitable type of reflective polarizer may be used for reflective polarizer layer 110 such as, for example, a multilayer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, reflective polarizer layer 110 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer layer 110 and an incident light in the unmatched polarization state is substantially reflected by reflective polarizer layer 110. In some cases, an MOF reflective polarizer layer 110 can include a stack of inorganic dielectric layers.

As another example, reflective polarizer layer 110 can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, reflective polarizer layer 110 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, reflective polarizer layer 110 can be a multilayer optical film that reflects or transmits light by optical interference, such as those described in U.S. Publication No. 2011/0222263; U.S. Pat. Nos. 8,998,776; 8,917, 448; 8,662,687; and WO 2008/144136; all incorporated herein by reference in their entirety.

Substantial portions of each two neighboring major surfaces in optical construction 100 are in physical contact with each other. For example, substantial portions of neighboring major surfaces 122 and 114 of respective neighboring layers 120 and 110 in optical construction 100 are in physical contact with each other. For example, at least 50%, or at least 60%, or at least 70%, or at least 80%, or at least 90%, or at least 95% of the two neighboring major surfaces are in physical contact with each other. For example, in some cases, optical film 120 is coated directly on reflective polarizer layer 110.

In general, substantial portions of neighboring major surfaces (major surfaces that face each other or are adjacent to each other) of each two neighboring layers in optical construction 100 are in physical contact with each other. For example, in some cases, there may be one or more additional layers disposed in between reflective polarizer layer 110 and optical film 120 as shown schematically in, for example, FIGS. 2 and 3. In such cases, substantial portions of neighboring major surfaces of each two neighboring layers in optical construction 100 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

Figure 2:
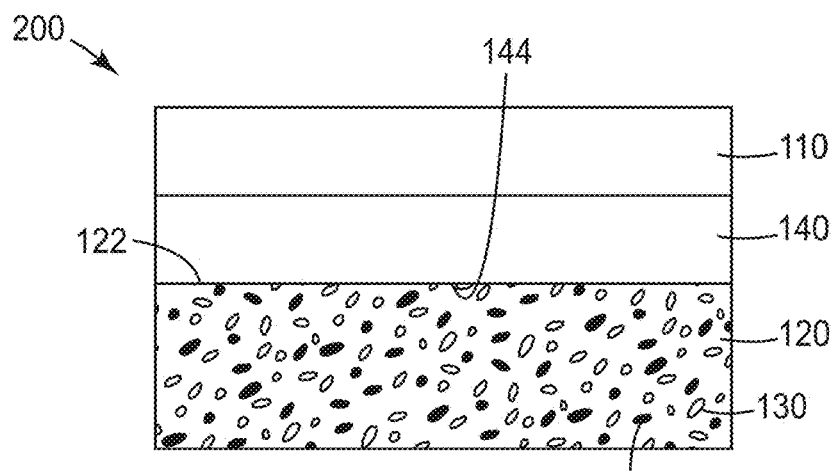
FIG. 2 is a schematic side-view of another optical construction.

In the exemplary optical construction 100, optical film 120 physically contacts reflective polarizer layer 110. For example, optical film 120 can be coated directly on bottom surface 144 of reflective polarizer layer 11. In some cases, one or more layers can be disposed between the two layers. For example, FIG. 2 is a schematic side-view of an optical construction 200 that include an optical adhesive layer 140 disposed between optical film 120 and reflective polarizer layer 110 for bonding the optical film to the polarizer layer.

In some cases, optical adhesive layer 140 has a high specular optical transmittance. For example, in such cases, the specular optical transmittance of the adhesive layer is not less than about 60%, or not less than about 70%, or not less than about 80%, or not less than about 90%.

In some cases, optical adhesive layer 140 is substantially optically diffusive and can have a white appearance. For example, in such cases, the optical haze of an optically diffusive adhesive layer 140 is not less than about 30%, or not less than about 30%, or not less than about 50%, or not less than about 60%, or not less than about 70%, or not less than about 80%, or not less than about 90%, or not less than about 95%. In some case, the diffuse reflectance of the diffusive adhesive layer is not less than about 20%, or not less than about 30%, or not less than about 40%, or not less than about 50%, or not less than about 60%. In such cases, the adhesive layer can be optically diffusive by including a plurality of particles dispersed in an optical adhesive where the particles and the optical adhesive have different indices of refraction. The mismatch between the two indices of refraction can result in light scattering.

Optical adhesive layer 140 can include any optical adhesive that may be desirable and/or available in an application. Exemplary optical adhesives include pressure sensitive adhesives (PSAs), heat-sensitive adhesives, solvent-volatile adhesives, and UV-curable adhesives such as UV-curable optical adhesives available from Norland Products, Inc. Exemplary PSAs include those based on natural rubbers, synthetic rubbers, styrene block copolymers, (meth)acrylic block copolymers, polyvinyl ethers, polyolefins, and poly (meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

Figure 3:
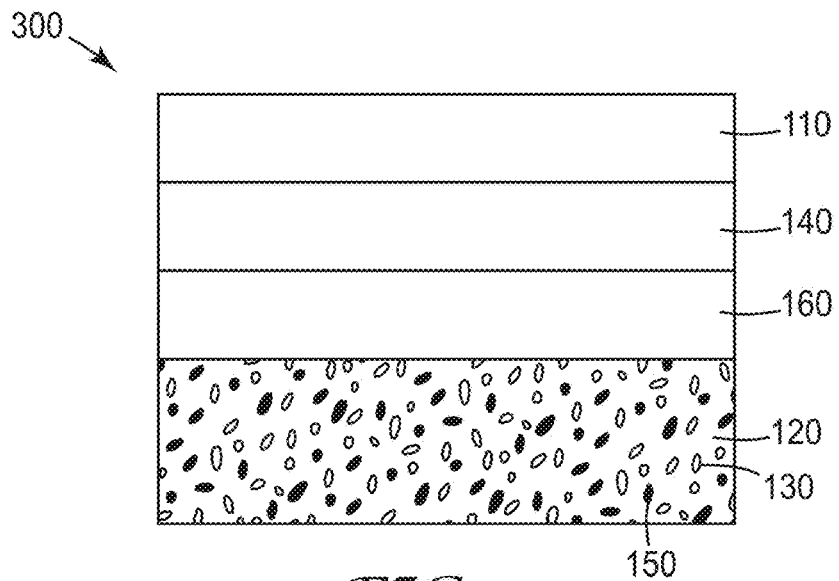
FIG. 3 is a schematic side-view of another optical construction.

FIG. 3 is a schematic side-view of an optical construction 300 that includes a substrate 160 disposed between optical adhesive layer 140 and optical film 120. For example, in some cases, optical film 120 is coated on substrate 160 and optical adhesive layer 140 adheres the coated substrate to reflective polarizer layer 110. As another example, in some cases, optical adhesive layer 140 and optical film 120 are coated on opposite major surfaces of the substrate and the adhesive laminates the two-sides coated substrate to the reflective polarizer layer.

Substrate 160 can be or include any material that may be suitable in an application, such as a dielectric, a semiconductor, or a metal. For example, substrate 160 can include or be made of glass and polymers such as polyethylene terapthalate (PET), polycarbonates, and acrylics. Substrate 160 can be rigid or flexible.

Each of optical constructions 100-300 is capable of having a small overall thickness while providing high optical gain. As used herein, "gain" or "optical gain" of an optical construction is defined as the ratio of the axial output luminance of an optical or display system with the optical construction to the axial output luminance of the same optical or display system without the optical construction. The inclusion of any of optical constructions 100-300 in a display system allows for a reduction in the overall size of display system with no or very little loss in the optical gain of the display system. In some cases, optical constructions 100-300 have optical gains that are not less than about 1.1, or not less than about 1.2, or not less than about 1.2, or not less than about 1.25, or not less than about 1.3, or not less than about 1.35, or not less than about 1.4, or not less than about 1.45, or not less than about 1.5.

Figure 9:
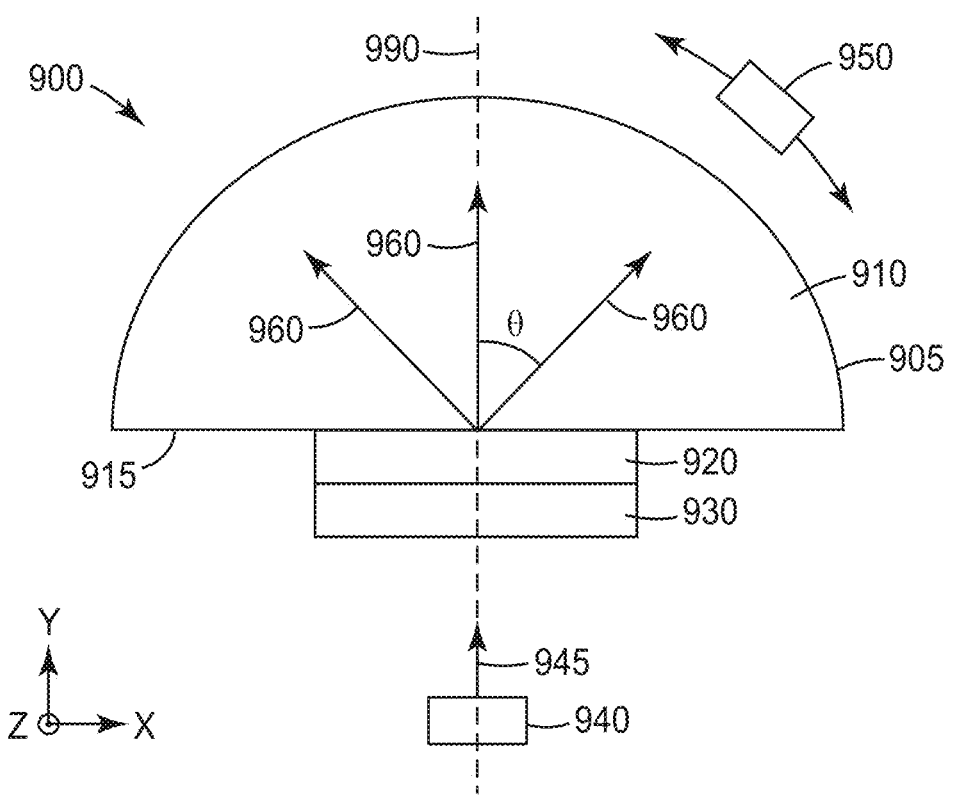
FIG. 9 is a schematic side-view of an optical system for measuring scattering properties of an optical diffuser.

FIG. 9 is a schematic side-view of an optical system 900 centered on an optical axis 990 for measuring light scattering of an optically diffusive film. Optical system 900 includes a half-sphere 910 that includes a spherical surface 905, a flat bottom surface 915, and an index of refraction $n_h$, an optically diffusive film 930 laminated to bottom surface 915 via an optical adhesive layer 920, a light source 940 emitting light 945, and an optical detector 950 for detecting light that is scattered by test sample 930.

Light 945 emitted by light source 940 propagates along optical axis 990 and is scattered by optically diffusive film 930 inside half-sphere 910 which is a high-index medium having the refractive index $n_h$. Accordingly, in the presence of the half-sphere, optical system 900 measures the scattering of an optically diffusive film in a high-index medium. On the other hand, with the half-sphere removed, detector 950 detects and measures the light scattering of optically diffusive film 950 in a low-index medium (air).

The scattering properties of various porous and non-porous optically diffusive films were measured in low-index (air) and high-index ($n_h$) media using an Imaging Sphere (available from Radiant Imaging Inc., Duvall, Wash..). The Imaging Sphere was similar to optical system 900. A half-sphere of solid acrylic with a diameter of 63 mm was placed inside the Imaging Sphere with the flat bottom surface against the sample port where film samples could be adhered to the center of the half-sphere. The index of refraction of the hemisphere is about 1.49. Incident light 945 was white light with a beam diameter of about 4 mm. For each optically diffusive film, first, the scattering of the film was measured in air. Next, the film was laminated to bottom surface 915 of half-sphere 910 via optical adhesive layer 920 (optically clear adhesive OCA 8171 available from 3M Company, St. Paul Minn.) and the scattering was measured in the acrylic medium.

Figure 10:
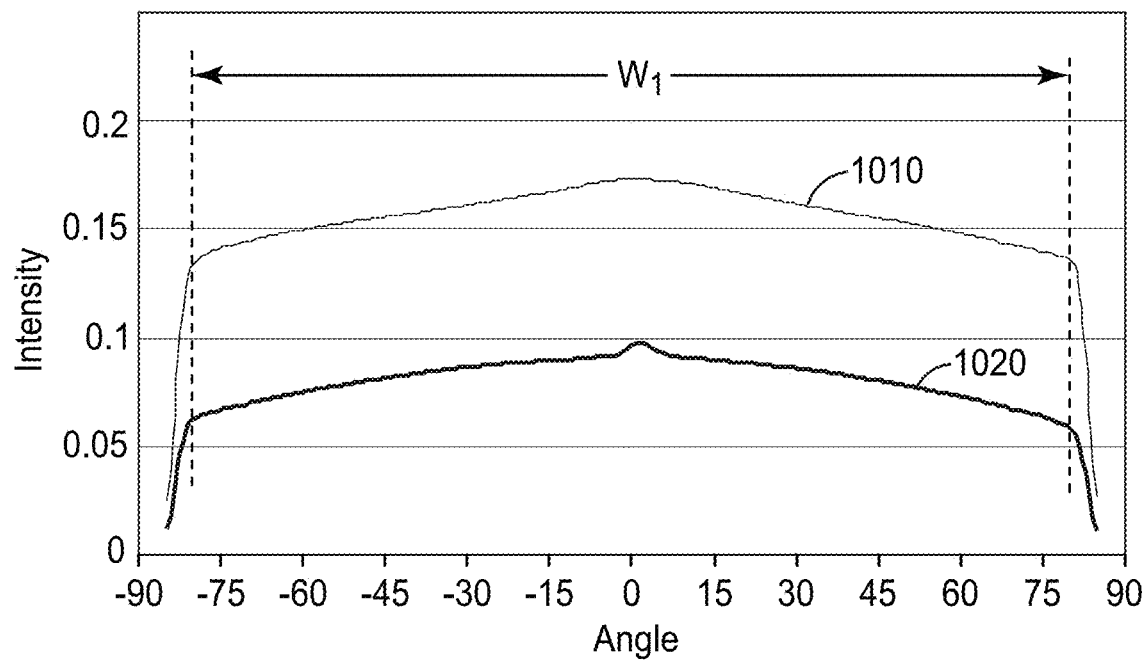
FIG. 10 is the scattering distribution for a porous optically diffusive film and a non-porous optically diffusive film in air.

FIG. 10 shows the scattering distribution measured for a porous optically diffusive film and a non-porous optically diffusive film in air. The horizontal axis in FIG. 10 is the scattering angle θ measured from optical axis 990 and the vertical axis is the intensity of scattered light. Curve 1010 is the measured scattering distribution measured for the non-porous optically diffusive film OF7 described in Example 13, and Curve 1020 is the measured scattering distribution for the porous optical film OF3 also described in Example 13. Both films have the same scattering width $W_1$.

Figure 11:
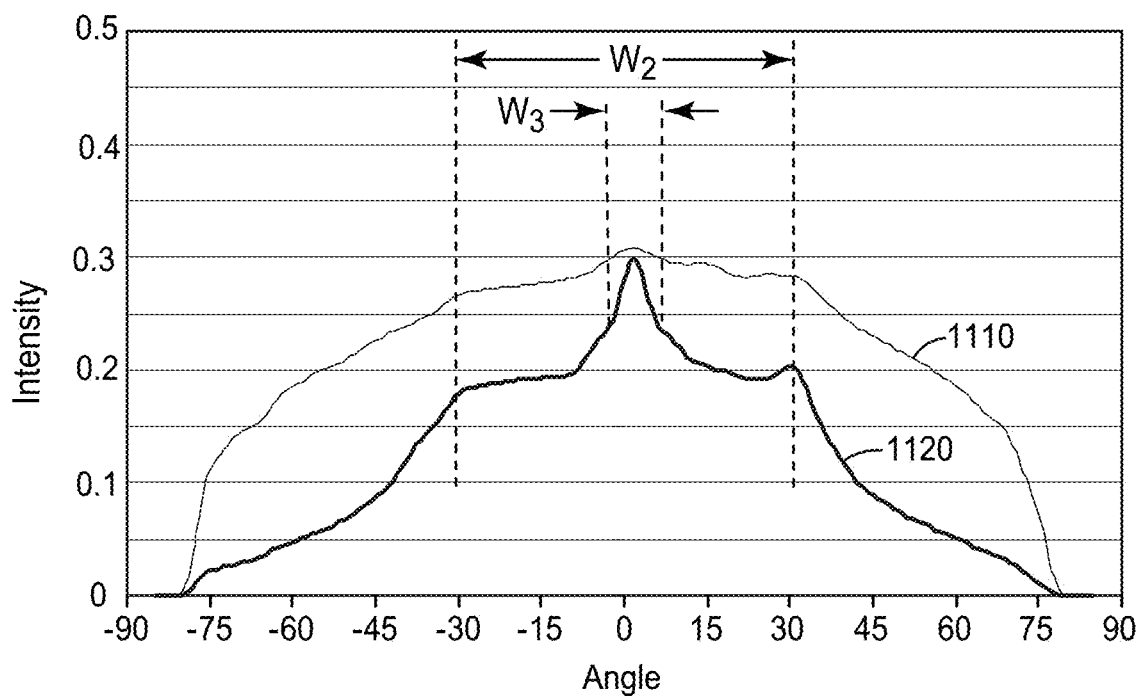
FIG. 11 is the scattering distribution for the two films in FIG. 10 in a high-index medium.

FIG. 11 shows the scattering distribution measured for the two films in the high-index medium. Curve 1110 is the measured scattering distribution measured for the non-porous optically diffusive film and Curve 1120 is the measured scattering distribution for the porous optically diffusive film. The non-porous diffusive film had a scattering distribution width $W_2$ that substantially greater than the scattering distribution width $W_3$ of the porous diffusive film. Hence, although porous and non-porous optically diffusive films with similar transmittance and reflectance properties have similar scattering distribution properties in air, the porous optically diffusive films have substantially narrower scattering widths in high-index media than non-porous optically diffusive films.

Figure 4A:
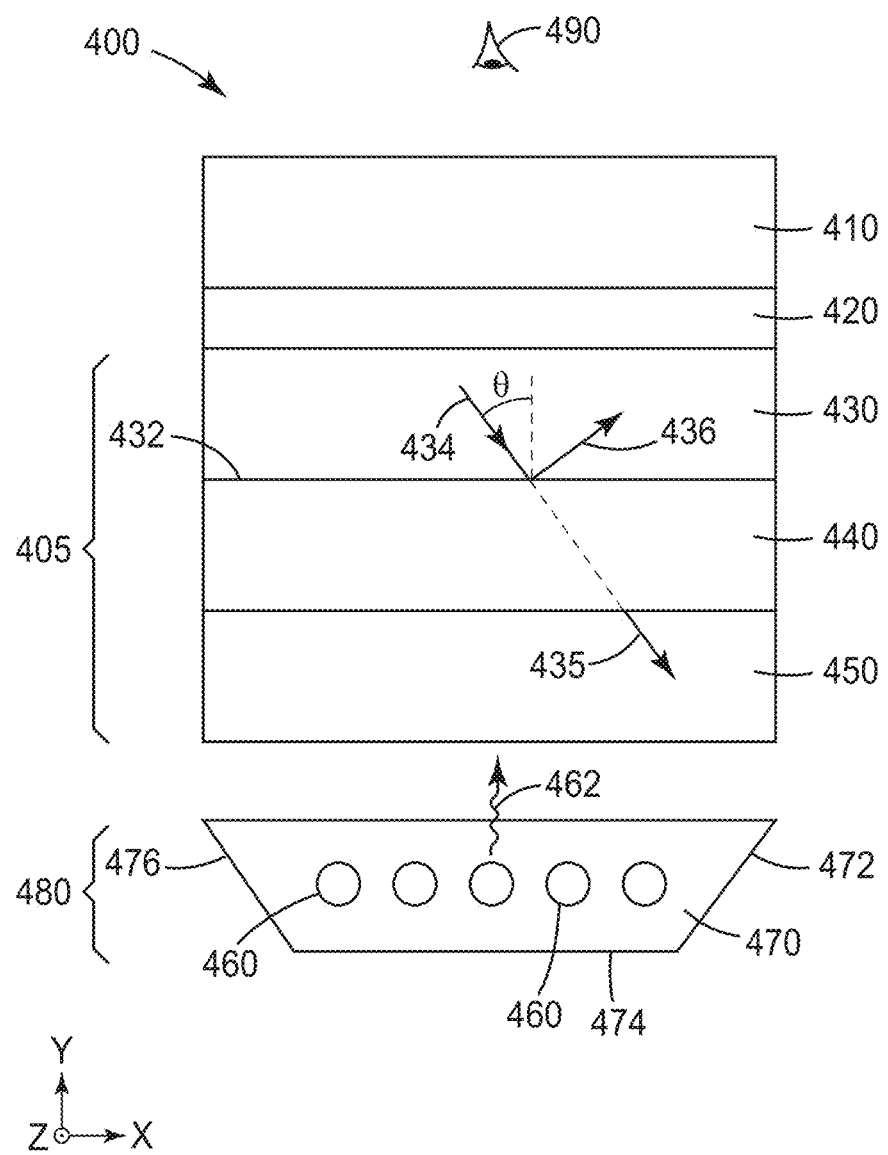
FIG. 4A is a schematic side-view of a display system.

FIG. 4A is a schematic side-view of a display system 400 that includes a liquid crystal panel 410 that is laminated to an optical construction 405 via an optical adhesive layer 420, and a light source 480 that emits light 462 towards optical construction 405.

Optical construction 405 includes an optical diffuser layer 450, an optical film 440 disposed on the optical diffuser layer, and a reflective polarizer layer 430 disposed on the optical film. Light source 480 includes a plurality of lamps 460 that face optical construction 405 and a light reflecting cavity 470 that includes a back reflector 474 and side reflectors 472 and 476. At least one of the lamps 460 is at least partially housed within reflective optical cavity 470. Light reflecting cavity 470 collects light that is emitted by lamps 460 in directions other than along the optical construction (positive y-direction), such as light that is emitted along the x- or negative y-direction and redirects such light toward optical construction 405 along the positive y-axis. Display systems such as display system 400 where lamps 460 face the major surfaces of the various layers in the system, are generally referred to as direct-lit display systems.

Optical film 440 has an index of refraction in the visible range of the electromagnetic spectrum that is less than about 1.4, or less than about 1.35, or less than about 1.30, or less than about 1.2, or less than about 1.15, or less than about 1.1. Optical film 440 has a small optical haze. For example, the optical haze of optical film 440 is not greater than about 10%, or not greater than about 8%, or not greater than about 6%, or not greater than about 5%, or not greater than about 4%, or not greater than about 3%, or not greater than about 2%, or not greater than about 1%, or not greater than about 0.5%. Optical film 440 has a high average specular optical transmittance in the visible. For example, the average specular optical transmittance of the optical film is greater than about 70%, or greater than about 75%, or greater than about 80%, or greater than about 85%, or greater than about 90%, or greater than about 95%.

Optical film 440 can be any optical film that includes a plurality of voids and has low haze and refractive index. For example, optical film 440 can be or include any optical film or any combination of optical films disclosed herein. For example, optical film 440 can be similar to optical film 120.

Optical film 440 promotes total internal reflection at a major surface 432 of reflective polarizer layer 430. For example, in some cases, the optical film promotes the total internal reflection of an incident light ray 434 having an incident angle θ as reflected light ray 436, where in the absence of the optical film, at least a significant portion of incident light ray 434 would leak through, or be transmitted by, reflective polarizer layer 430 as leaked light ray 435.

Optical diffuser 450 has the primary functions of hiding or masking lamps 460 and homogenizing light 462 that is emitted by light source 480. Optical diffuser layer 450 has a high optical haze and/or a high diffuse optical reflectance. For example, in some cases, the optical haze of the optical diffuser is not less than about 40%, or not less than about 50%, or not less than about 60%, or not less than about 70%, or not less than about 80%, or not less than about 85%, or not less than about 90%, or not less than about 95%. As another example, the diffuse optical reflectance of the optical diffuser is not less than about 30%, or not less than about 40%, or not less than about 50%, or not less than about 60%.

Optical diffuser 450 can be or include any optical diffuser that may be desirable and/or available in an application. For example, optical diffuser 450 can be or include a surface diffuser, a volume diffuser, or a combination thereof. For example, optical diffuser 450 can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

Reflective polarizer layer 430 substantially reflects light that has a first polarization state and substantially transmits light that has a second polarization state, where the two polarization states are mutually orthogonal. Any suitable type of reflective polarizer may be used for reflective polarizer layer 430. For example, reflective polarizer layer 430 can be similar to reflective polarizer layer 110.

Substantial portions of each two neighboring major surfaces in optical construction 405 are in physical contact with each other. For example, at least 50%, or at least 60%, or at least 70%, or at least 80%, or at least 90%, or at least 95% of each two neighboring major surfaces in the optical construction are in physical contact with each other. For example, in some cases, a layer in optical construction 405 is either laminated to or coated on a neighboring layer.

In general, substantial portions of neighboring major surfaces (major surfaces that face each other or are adjacent to each other) of each two neighboring layers in optical construction 405 are in physical contact with each other. For example, in some cases, there may be one or more additional layers disposed in between reflective polarizer layer 430 and optical film 440, but, in such cases, substantial portions of neighboring major surfaces of each two neighboring layers in optical construction 405 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

Liquid crystal panel 410 includes, not expressly shown in FIG. 4A, a layer of liquid crystal disposed between two panel plates, an upper light absorbing polarizer layer disposed above the liquid crystal layer, and a lower absorbing polarizer disposed below the liquid crystal layer. The upper and lower light absorbing polarizers and the liquid crystal layer, in combination, control the transmission of light from reflective polarizer layer 430 through liquid crystal panel 410 to a viewer 490.

Display system 400 is capable of having a small overall thickness while providing high optical gain. The inclusion of optical film 440 allows for a reduction in the overall size of display system 400 with no or very little loss in the optical gain of the display system. In some cases, display system 400 has an optical gain of at least about 1.1, or at least about 1.2, or at least about 1.2, or at least about 1.25, or at least about 1.3, or at least about 1.35, or at least about 1.4, or at least about 1.45, or at least about 1.5.

Figure 4B:
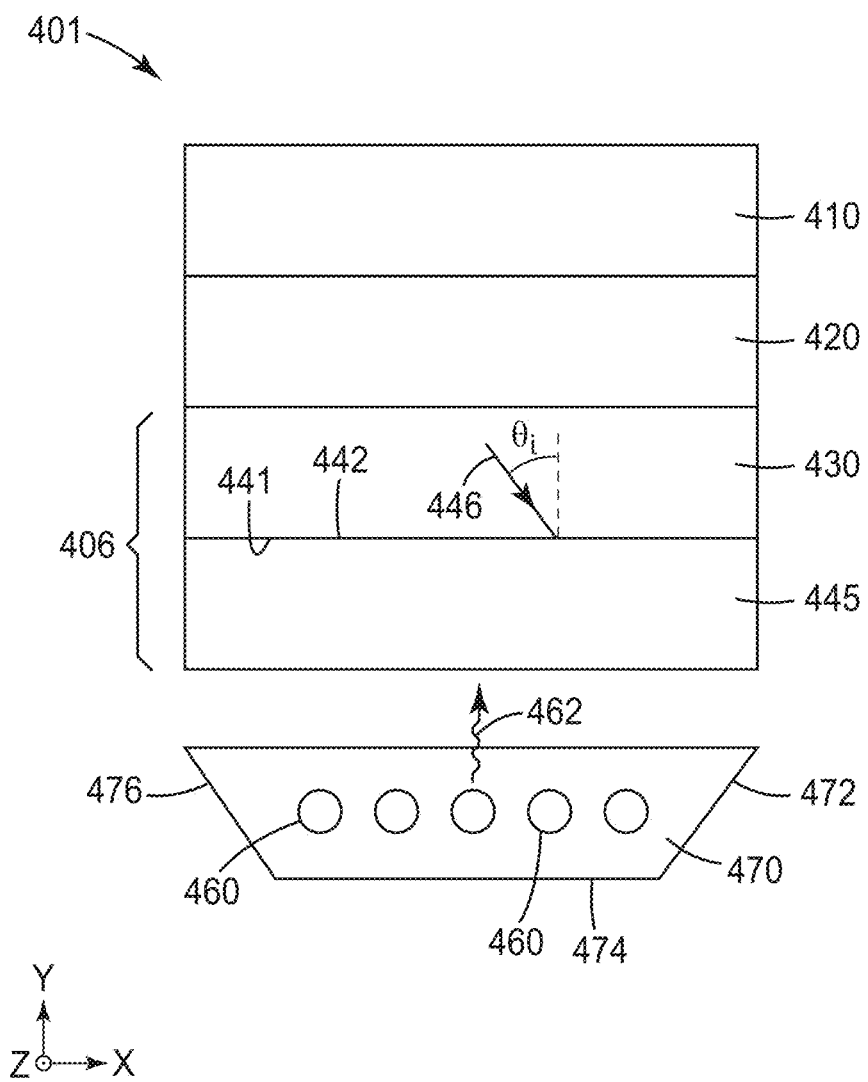
FIG. 4B is a schematic side-view of another display system.

FIG. 4B is a schematic side-view of a display system 401 that is similar to display system 400 except that optical construction 405 is replaced with an optical construction 406 that includes reflective polarizer layer 430 disposed on an optical film 445. Reflective polarizer layer 430 includes a first major surface 441 and optical film 445 includes a second major surface 442. Substantial portions of neighboring major surfaces 441 and 442 of respective neighboring layers 430 and 445 in optical construction 406 are in physical contact with each other. For example, at least 50%, or at least 60%, or at least 70%, or at least 80%, or at least 90%, or at least 95% of the two neighboring major surfaces are in physical contact with each other.

In general, substantial portions of neighboring major surfaces (major surfaces that face each other or are adjacent to each other) of each two neighboring layers in optical construction 406 are in physical contact with each other. For example, in some cases, there may be one or more additional layers, such as an adhesive layer and/or a substrate layer not expressly shown in FIG. 4B, disposed in between reflective polarizer 430 and optical film 445. In such cases, substantial portions of neighboring major surfaces of each two neighboring layers in optical construction 406 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

Optical film 445 includes a plurality of voids, and has high optical haze and a narrow scattering distribution width in high-index media. For example, optical film 445 has an optical haze that is not less than about 20%, or not less than about 30%, or not less than about 40%, or not less than about 50%, or not less than about 60%, or not less than about 70%, or not less than about 80%, or not less than about 90%, or not less than about 95%. Optical film 445 can be any optical film disclosed herein. For example, optical film 445 can be similar to optical film 120.

Optical film 445 advantageously allows for reduction of the overall thickness and manufacturing cost of display system 401. At the same time, the optical film 445 has high optical haze and reflectance. Furthermore, the optical film provides for large optical gain by virtue of having a narrow scattering distribution width in high-index media. For example, the optical gain of optical construction 406 is at least about 1.1, or at least about 1.15, or at least about 1.2, or at least about 1.25, or at least about 1.3, or at least about 1.35, or at least about 1.4, or at least about 1.45, or at least about 1.5.

Figure 5A:
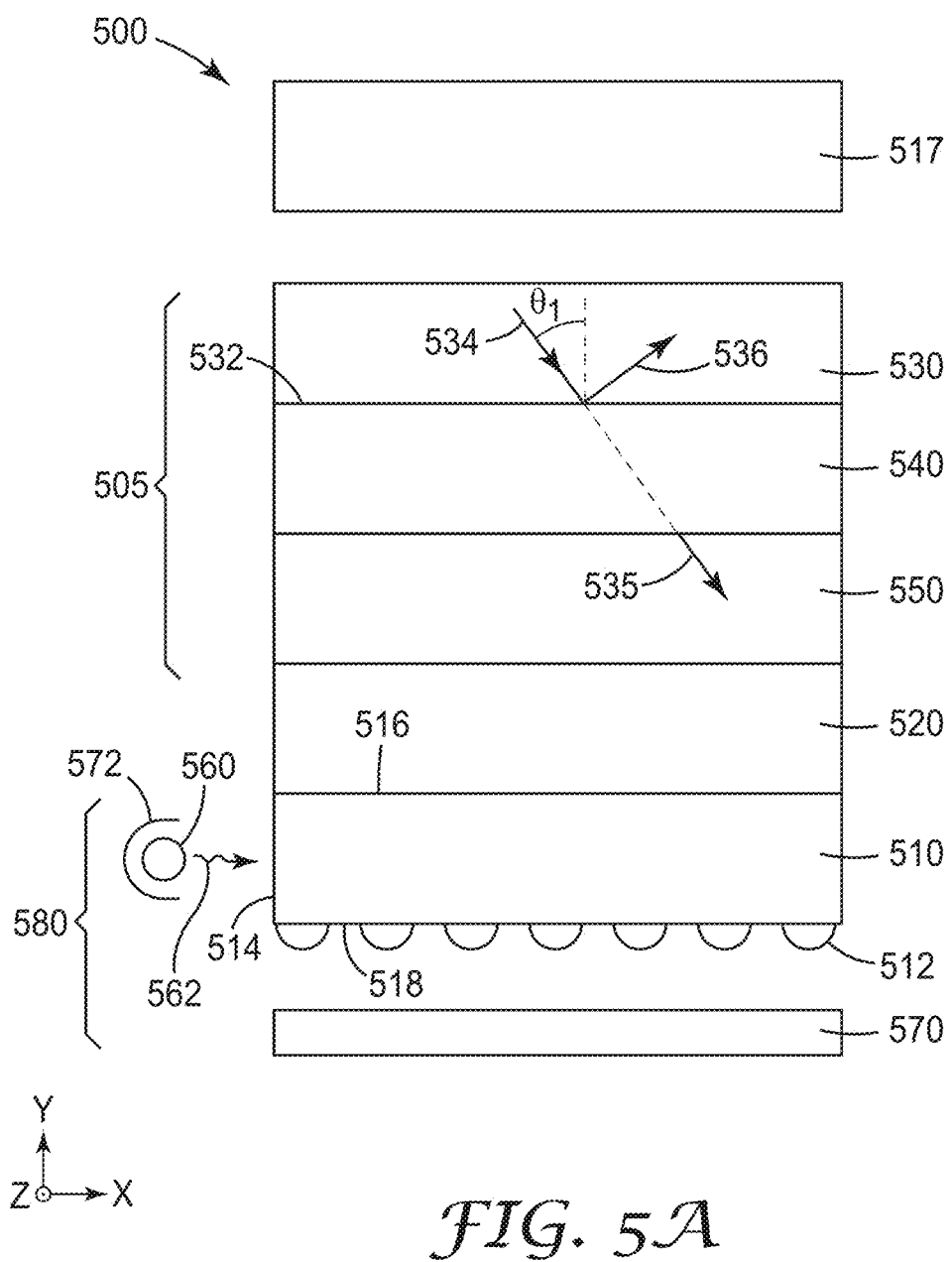
FIG. 5A is a schematic side-view of another display system.

FIG. 5A is a schematic side-view of a display system 500 that includes a liquid crystal panel 517 and an optical construction 505 that is laminated to a light source or backlight 580 via an optical adhesive layer 520.

Optical construction 505 includes an optical diffuser layer 550 similar to optical diffuser layer 450, an optical film 540 similar to optical film 440 and disposed on the optical diffuser layer, and a reflective polarizer layer 530 similar to reflective polarizer layer 530 and disposed on the optical film. Light source 580 includes a lightguide 510, a lamp 560 that is placed along an edge 514 of the light guide and housed inside a side reflector 572, and a back reflector 570.

In general, backlight 580 can include one or more lamps placed along one or more edges of lightguide 510.

Light 562 emitted from lamp 560 enters lightguide 510 through edge 514 of the lightguide. The entered light propagates in lightguide 510 in the general x-direction by reflection, such as by total internal reflection, at major surfaces 516 and 518. Major surface 518 includes a plurality of light extractors 512 that are capable of extracting light that propagates in the lightguide. In general, the spacing between neighboring light extractors can be different at different locations on major surface 518. Furthermore, the shape, respective heights, and/or size of the light extractors can be different for different light extractors. Such a variation can be useful in controlling the amount of light extracted at different locations on major surface 518.

Back reflector 570 receives light that is emitted by the light guide away from optical construction 505 along the negative y-direction and reflects the received light towards the optical construction. Display systems such as display system 500 where lamps 560 are placed along the edges of a lightguide, are generally referred to as edge-lit or backlit displays or optical systems.

Optical film 540 includes a plurality of voids and has an effective index of refraction that is less than about 1.4, or less than about 1.35, or less than about 1.30, or less than about 1.2, or less than about 1.15, or less than about 1.1. Optical film 540 has a small optical haze. For example, the optical haze of optical film 540 is not greater than about 20%, or not greater than about 15%, or not greater than about 10%, or not greater than about 8%, or not greater than about 6%, or not greater than about 5%, or not greater than about 4%, or not greater than about 3%, or not greater than about 2%. Optical film 540 has a high average specular transmittance in the visible. For example, the average specular transmittance of the optical film is at least greater than about 70%, or at least greater than about 75%, or at least greater than about 80%, or at least greater than about 85%, or at least greater than about 90%, or at least greater than about 95%.

Optical film 540 can be or include any optical film or optical films disclosed herein. For example, optical film 540 can be similar to optical film 120. Optical film 540 promotes total internal reflection at a major surface 532 of reflective polarizer layer 530. For example, in some cases, the optical film promotes the total internal reflection of an incident light ray 534 having a large incident angle $\theta_1$ as reflected light ray 536, where in the absence of the optical film, at least a significant portion of incident light ray 534 would leak through, or be transmitted by, reflective polarizer layer 530 as leaked light ray 535.

Optical diffuser 550 has the primary functions of effectively hiding lamp 560 and extractors 512, and homogenizing light that exits lightguide 510. Optical diffuser layer 550 has a high optical haze and/or a high diffuse optical transmittance. For example, in some cases, the optical haze of the optical diffuser is not less than about 40%, or not less than about 50%, or not less than about 60%, or not less than about 70%, or not less than about 80%, or not less than about 85%, or not less than about 90%, or not less than about 95%.

Optical diffuser 550 can be or include any optical diffuser that may be desirable and/or available in an application. For example, optical diffuser 450 can be similar to optical diffuser 450.

Display system 500 is capable of having a small overall thickness while providing high optical gain. The inclusion of optical film 540 allows for a reduction in the overall size of display system 500 with no or very little loss in the optical gain of the display system. In some cases, display system 500 has an optical gain of at least about 1.1, or at least about 1.2, or at least about 1.2, or at least about 1.25, or at least about 1.3, or at least about 1.35, or at least about 1.4, or at least about 1.45, or at least about 1.5.

Figure 5B:
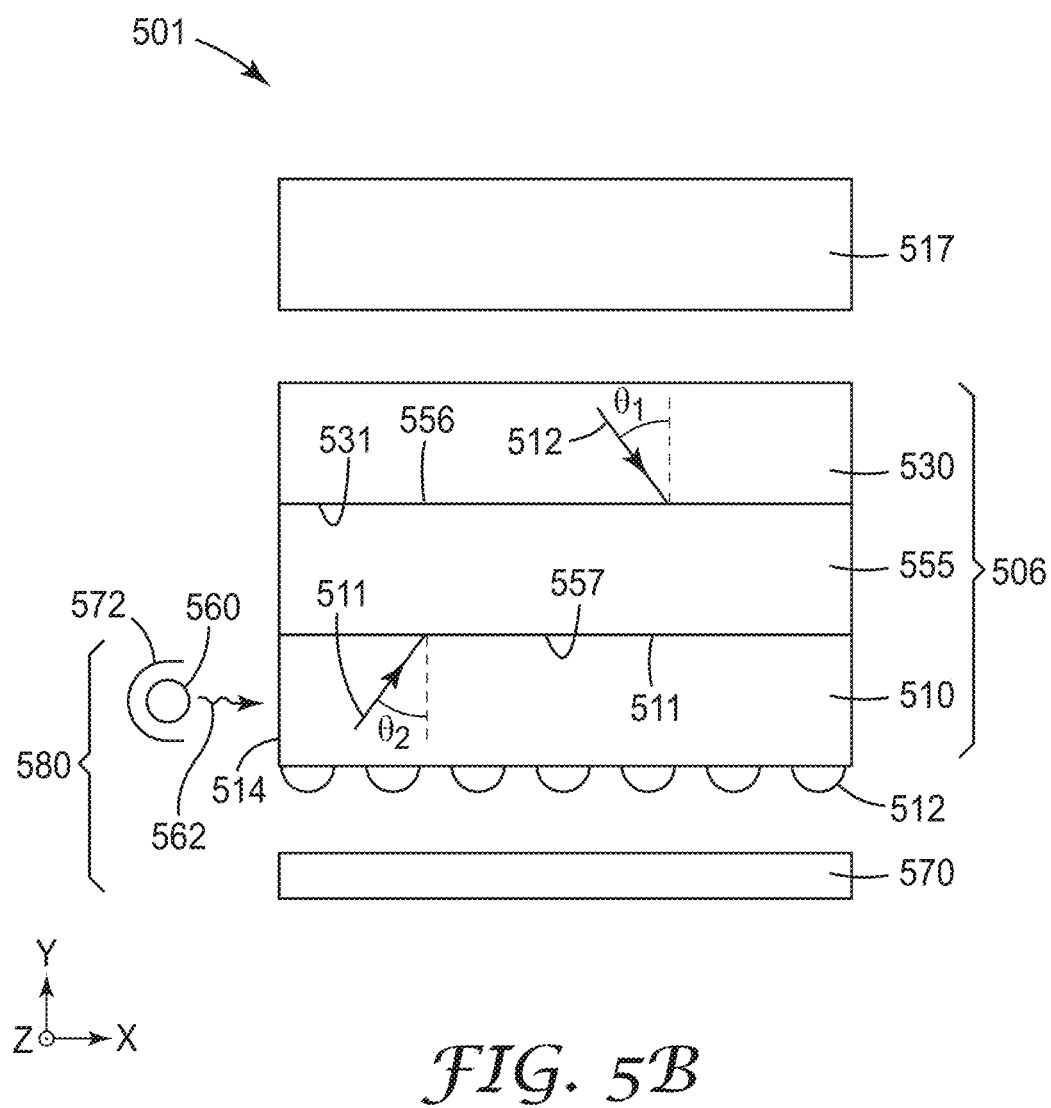
FIG. 5B is a schematic side-view of another display system.

FIG. 5B is a schematic side-view of a display system 501 that includes an optical construction 506 that includes lightguide 510, an optical film 555 disposed on the lightguide, and reflective polarizer 430 disposed on the optical film. Reflective polarizer layer 530 includes a first major surface 531 that faces optical film 555, optical film 555 includes a first major surface 557 facing the lightguide and a second major surface 556 facing the reflective polarizer layer, and lightguide 510 includes an exit surface 511 facing the optical film. Substantial portions of neighboring major surfaces 531 and 556 of the two respective neighboring layers 530 and 555 in optical construction 506 are in physical contact with each other. For example, at least 50%, or at least 60%, or at least 70%, or at least 80%, or at least 90%, or at least 95% of the two neighboring major surfaces are in physical contact with each other.

Substantial portions of neighboring major surfaces 557 and 511 of the two respective neighboring layers 555 and 510 in optical construction 506 are in physical contact with each other. For example, at least 50%, or at least 60%, or at least 70%, or at least 80%, or at least 90%, or at least 95% of the two neighboring major surfaces are in physical contact with each other.

In general, substantial portions of neighboring major surfaces (major surfaces that face each other or are adjacent to each other) of each two neighboring layers in optical construction 506 are in physical contact with each other. For example, in some cases, there may be one or more additional layers, such as an adhesive layer and/or a substrate layer not expressly shown in FIG. 5B, disposed in between reflective polarizer 530 and optical film 555. In such cases, substantial portions of neighboring major surfaces of each two neighboring layers in optical construction 506 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

Optical film 555 can be any optical film disclosed herein. For example, optical film 555 can be similar to optical film 445. Optical film has high optical haze and is capable of preserving or maintaining the optical gain of display system 501 by virtue of having a narrow scattering distribution in high-index media. For example, the optical gain of the optical construction 506 is at least about 1.1, or at least about 1.2, or at least about 1.2, or at least about 1.25, or at least about 1.3, or at least about 1.35, or at least about 1.4, or at least about 1.45, or at least about 1.5.

Optical film 555 manifests some low-refractive-index-like properties. For example, optical diffuser 555 can support TIR or enhance internal reflection. For example, a light ray 512 that is incident on the interface between the optical diffuser layer and the reflective polarizer layer with an incident angle $\theta_1$, under goes TIR or enhanced reflection. As another example, a light ray 511 that is incident on the interface between the optical film and the lightguide with an incident angle $\theta_2$, under goes TIR or enhanced reflection.

Figure 17:
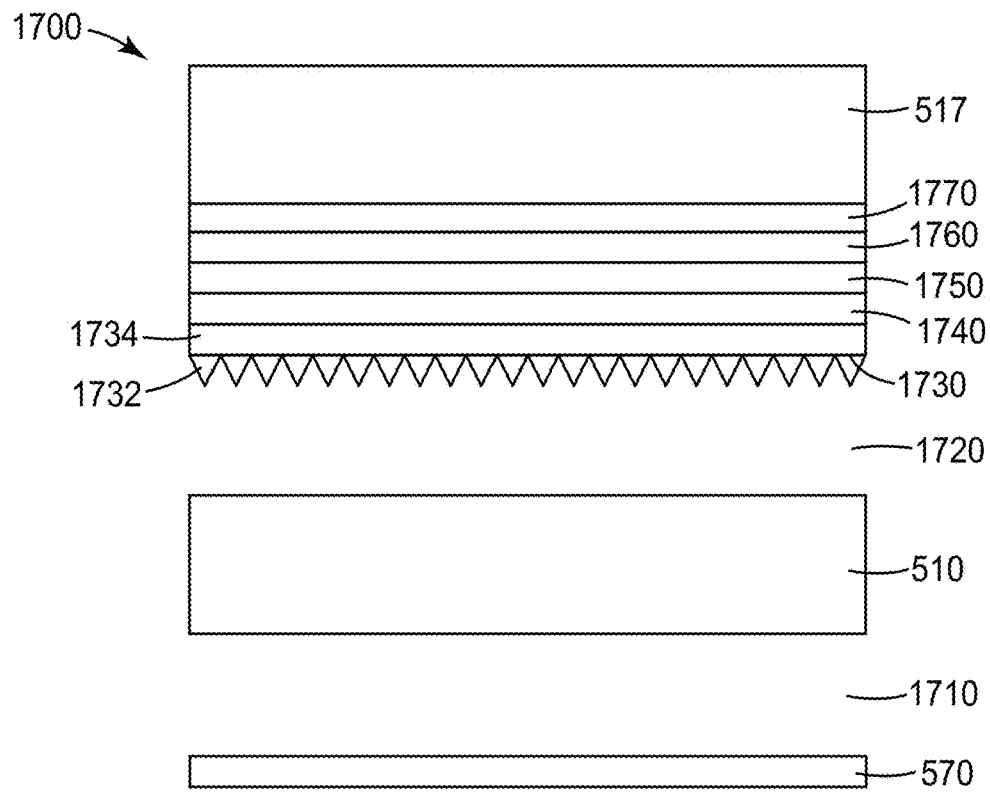
FIG. 17 is a schematic side-view of a display system.

FIG. 17 is a schematic side-view of a display system 1700 that includes back reflector 570, lightguide 510 separated from the back reflector by an air gap 1710, a turning film disposed on the lightguide and separated from the light by an air gap 1720, an optical adhesive layer 1740 disposed on the turning film, an optical film 1750 disposed on the optical adhesive layer, a reflective polarizer layer 1760 disposed on the optical film, an optical adhesive layer 1770 disposed on reflective polarizer layer and liquid crystal panel 517 disposed on the optical adhesive layer.

Turning film 1730 redirects light that it receives from lightguide 510. In some cases, such as when display system 1700 includes an obliquely illuminated backlight, turning film 1730 has the optical effect of redirecting the bright off-axis lobes of the display system towards the viewing axis of the display. Turning film 1730 includes a plurality of structures 1732 facing lightguide 1732 and disposed on a substrate 1734. In some cases, structures 1732 can be prismatic. For example, in some cases, turning film 1730 can be an inverted prismatic brightness enhancement film.

Optical film 1750 can be any optical film disclosed herein. For example, optical film 1750 can be similar to optical film 555 or 540. In general, optical film 1750 can have any optical haze that may be desirable in an application. For example, in some cases, optical film 1750 can have an optical haze that is in a range from about 5% to about 70%, or from about 10% to about 60%, or from about 10% to about 50%, or from about 10% to about 40%, or from about 15% to about 35%, or from about 20% to about 30%. In some cases, the haze of the optical film is not greater than about 20%. In some cases, the haze of the optical film is not less than about 20%.

In general, lightguide 510 can be made of any material and can have any shape that may be desirable in an application. For example, lightguide 510 can be made of polycarbonate or acrylic, and may be rectangular and wedge shaped in cross-section. Lightguide 510 can includes extraction features not expressly shown in FIG. 17. The extraction features and the lightguide can, in some cases, be molded during an injection molding process.

Optical adhesive layers 1770 and 1740 can be similar to optical adhesive layer 420. In some cases, optical adhesive layer 1770 and/or 1740 can be optically diffusive. Reflective polarizer layer can be similar to reflective polarizer layer 430.

Figure 18:
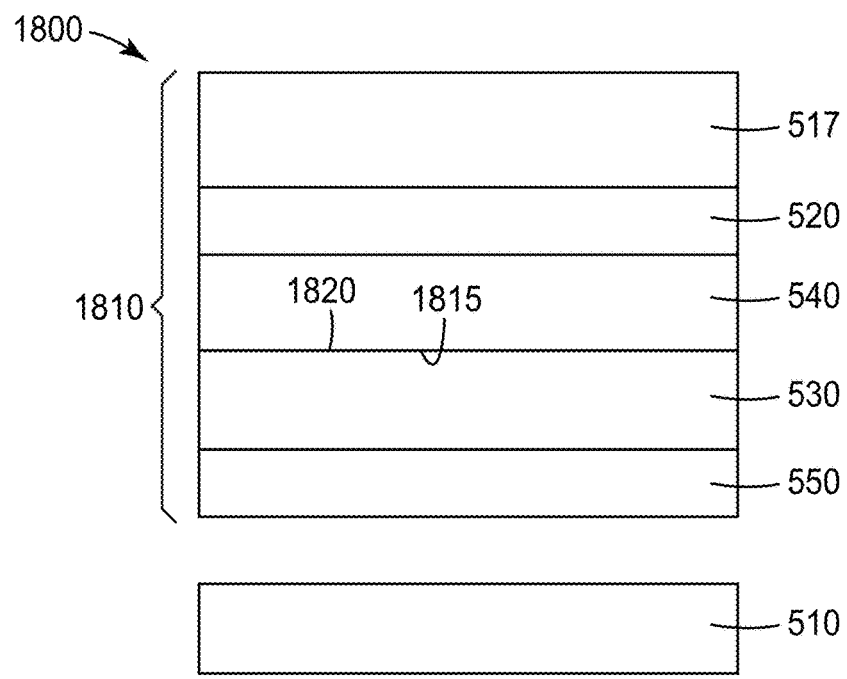
FIG. 18 is a schematic side-view of another display system.

FIG. 18 is a schematic side-view of a display system 1800 that includes an optical stack 1810 facing lightguide 510. Optical stack 1810 includes optical diffuser layer 510, reflective polarizer layer 530, optical film 540, and optical adhesive layer 520, and liquid crystal panel 517.

Liquid crystal panel 517 includes, not expressly shown in FIG. 18, a layer of liquid crystal disposed between two panel plates, an upper light absorbing polarizer layer disposed above the liquid crystal layer, and a lower absorbing polarizer disposed below the liquid crystal layer. The upper and lower light absorbing polarizers and the liquid crystal layer, in combination, control the transmission of light from reflective polarizer layer 530 through liquid crystal panel 410 to a viewer facing the display system.

Optical stack 1810 includes at least one light absorbing polarizer layer that is part of liquid crystal panel 517 and has a pass-axis that is in the same direction as the pass-axis of reflective polarizer layer 530.

In general, optical film 540, reflective polarizer layer 530, and optical diffuser layer 550 can be disposed in any order in optical stack 1810 that may be desirable in an application. Furthermore, optical film 540 and optical diffuser layer 550 can have any optical haze or diffuse reflectance that may be desirable in an application. For example, in some cases, the reflective polarizer layer can be disposed between the liquid crystal panel (or the linear absorbing polarizer) and the optical film. In such cases, the optical film can have a low or high optical haze. For example, the optical film can have an optical haze that is not greater than about 20%, or not greater than about 15%, or not greater than about 10%, or not greater than about 5%, or not greater than about 4%, or not greater than about 3%, or not greater than about 2%, or not greater than about 1%. As another example, the optical film can have an optical haze that is not less than about 20%, or not less than about 30%, or not less than about 40%, or not less than about 50%, or not less than about 60%, or not less than about 70%, or not less than about 80%, or not less than about 90%, or not less than about 95%.

In some cases, the optical film can be disposed between the absorbing polarizer (or the liquid crystal panel) liquid crystal panel and the reflective polarizer layer. In such cases, the optical film can have a low or high optical haze. For example, the optical film can have an optical haze that is not greater than about 20%, or not greater than about 15%, or not greater than about 10%, or not greater than about 5%, or not greater than about 4%, or not greater than about 3%, or not greater than about 2%, or not greater than about 1%. As another example, the optical film can have an optical haze that is not less than about 20%, or not less than about 30%, or not less than about 40%, or not less than about 50%, or not less than about 60%, or not less than about 70%, or not less than about 80%, or not less than about 90%, or not less than about 95%.

In some cases, the optical film can be disposed between the reflective polarizer layer and the optical diffuser layer. In some cases, the reflective polarizer layer is disposed between the optical film and the optical diffuser layer.

Substantial portions of each two neighboring major surfaces in optical stack 1810 are in physical contact with each other. For example, substantial portions of neighboring major surfaces 1820 and 1815 of respective neighboring layers 540 and 530 in optical stack 1810 are in physical contact with each other. For example, at least 50%, or at least 60%, or at least 70%, or at least 80%, or at least 90%, or at least 95% of the two neighboring major surfaces are in physical contact with each other. For example, in some cases, optical film 540 is coated directly on reflective polarizer layer 530.

In general, substantial portions of neighboring major surfaces (major surfaces that face each other or are adjacent to each other) of each two neighboring layers in optical stack 1810 are in physical contact with each other. For example, in some cases, there may be one or more additional layers disposed in between reflective polarizer layer 530 and optical film 540, not shown expressly in FIG. 18. In such cases, substantial portions of neighboring major surfaces of each two neighboring layers in optical stack 1810 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

Some of the advantages of the disclosed films, layers, constructions, and systems are further illustrated by the following examples. The particular materials, amounts and dimensions recited in this example, as well as other conditions and details, should not be construed to unduly limit the present invention.

In the examples, the index of refraction was measured using a Metricon Model 2010 Prism Coupler (available from Metricon Corp., Pennington, N.J.). Optical transmittance and haze were measured using a Haze-guard Plus haze meter (available from BYK-Gardiner, Silver Springs, Md.).

Example A

A coating solution "A" was made. First, a "906" composition (available from 3M Company, St. Paul, Minn.) was obtained. The 906 composition included: 18.4 wt % 20 nm silica particles (Nalco 2327) surface modified with methacryloyloxypropyltrimethoxysilane (acrylate silane), 25.5 wt % Pentaerthritol tri/tetra acrylate (PETA), 4.0 wt % N,N-dimethylacrylamide (DMA), 1.2 wt % Irgacure 184, 1.0 wt % Tinuvin 292, 46.9 wt % solvent isopropanol, and 3.0 wt % water. The 906 composition was approximately 50% solid by weight. Next, the 906 composition was diluted to 35 wt % solid with solvent 1-methoxy 2-propanol resulting in coating solution A.

Example B

A coating solution "B" was made. First, 360 g of Nalco 2327 colloidal silica particles (40% wt solid and an average particle diameter of about 20 nanometers) (available from Nalco Chemical Company, Naperville Ill.) and 300 g of solvent 1-methoxy-2-propanol were mixed together under rapid stirring in a 2-liter three-neck flask that was equipped with a condenser and a thermometer. Next, 22.15 g of Silquest A-174 silane (available from GE Advanced Materials, Wilton Conn.) was added. The mixture was stirred for 10 min. Next, an additional 400 g of 1-methoxy-2-propanol was added. The mixture was heated at 85° C. for 6 hours using a heating mantle. The resulting solution was allowed to cool down to room temperature. Next, most of water and 1-methoxy-2-propanol solvents (about 700 g) were removed using a rotary evaporator under a 60° C. water-bath. The resulting solution was 44% wt A-174 modified 20 nm silica clear dispersed in 1-methoxy-2-propanol. Next, 70.1 g of this solution, 20.5 g of SR 444 (available from Sartomer Company, Exton Pa.), 1.375 g of photoinitiator Irgacure 184 (available from Ciba Specialty Chemicals Company, High Point N.C.), and 80.4 g of isopropyl alcohol were mixed together by stirring to form a homogenous coating solution B.

Example C

A coating solution "C" was made. First, 100g of Cabot PG002 fumed silica (available from Cabot Corporation, Billerica Mass.) was added to a 500 ml 3-neck flask that was equipped with a condenser, a stir bar and stir plate, a temperature controller and a heating mantle. Next, a premix of 3.08 g Silquest A174 and 100 g of 1-methoxy-2-propanol was added to the flask. The mixture was stirred at 80° C. for about 16 hours. The resulting mixture had low viscosity and had a hazy translucent appearance. The mixture was then cooled to room temperature.

Next, the mixture was transferred to a 500 ml one-neck distillation flask. The water was removed from the mixture by alternate vacuum distillation and using a rotary evaporator (Rotavapor available from BUCHI Corporation, New Castle, Del.) and addition of 160 g of 1-methoxy-2-propanol. The mixture was further concentrated by vacuum distillation resulting in 78.4 g of a low viscosity, hazy, translucent dispersion with 25.6 wt % solids.

Next, 78.4 g of A-174 modified fumed Silica, 13.38 g of SR444, 0.836 g of photoinitiator Irgcure 184, and 19.7 g of isopropyl alcohol were mixed and stirred resulting in a homogenous coating solution "C".

Example D

A coating solution "D" was made. First, in a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes.

The mixture was then kept at 81° C. for 16 hours. Next, the solution was allowed to cool down to room temperature. Next, about 950 grams of the solvent in the solution were removed using a rotary evaporator under a 40° C. waterbath, resulting in a 41.7% wt A-174-modified elongated silica clear dispersion in 1-methoxy-2-propanol.

Next, 407 grams of this clear dispersion, 165.7 grams of SR 444 (available from Sartomer Company, Exton, Pa.), 8.28 grams of photoinitiator Irgacure 184 and 0.828 grams of photoinitiator Irgacure 819 (both available from Ciba Specialty Chemicals Company, High Point N.C.), and 258.6 grams of isopropyl alcohol were mixed together and stirred resulting in a homogenous coating solution of 40% solids. Next, 300 grams of this solution was mixed with 100 grams of isopropyl alcohol resulting in a coating solution of 30% solids.

Example E

A coating procedure "E" was developed. First, a coating solution was syringe-pumped at a rate of 3 cc/min into a 10.2 cm (4-inch) wide slot-type coating die. The slot coating die uniformly distributed a 10.2 cm wide coating onto a substrate moving at 152 cm/min (5 ft/min).

Next, the coating was polymerized by passing the coated substrate through a UV-LED cure chamber that included a quartz window to allow passage of UV radiation. The UV-LED bank included a rectangular array of 160 UV-LEDs, 8 down-web by 20 cross-web (approximately covering a 10.2 cm×20.4 cm area). The LEDs (available from Cree, Inc., Durham N.C.) operated at a nominal wavelength of 385 nm, and were run at 45 Volts at 8 Amps, resulting in a UV-A dose of 0.212 joules per square cm. The UV-LED array was powered and fan-cooled by a TENMA 72-6910 (42V/10A) power supply (available from Tenma, Springboro Ohio). The UV-LEDs were positioned above the quartz window of the cure chamber at a distance of approximately 2.5 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coated substrate to a drying oven at 150° F. for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

Example F

A coating procedure "F" was developed. First, a coating solution was syringe-pumped at a rate of 5.4 cc/min into a 20.3 cm (8-inch) wide slot-type coating die. The slot coating die uniformly distributed a 20.3 cm wide coating onto a substrate moving at 5ft/min (152 cm/min).

Next, the coating was polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 10 Amps, resulting in a UV-A dose of 0.108 joules per square cm. The UV-LED array was powered and fan-cooled by a TENMA 72-6910 (42V/10A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

Example G

Coating solutions 1-9 were made using hydrophobic resins listed in Table I. For each coating solution, the resin and the fumed silica (available as TS-530 from Cabot Corporation, Billerica Mass.) at the weight ratio specified in Table I were mixed with the corresponding solvent also specified in Table I. The resin had a wt-part of 1. For example, for coating solution 1, the weight ratio of resin FC2145 to fumed silica was 1:5.

The resin used in coating solutions 1, 2, and 9 was Dyneon Fluoroelastomer Copolymer FC2145 (available from Dyneon LLC, Oakdale Minn.). The resin used in coating solutions 3 and 4 was SPU-5k which was a silicone polyurea formed from the reaction between an α□ω aminoproply polydiemthyl siloxane and m-tetramethyl xylene diisocyante as generally described in U.S. Pat. No. 6,355,759, Example #23. The resin used in coating solutions 5 and 6 was SR-351, a UV-polymerizable monomer (available from Sartomer Company, Exton Pa.). The resin used in coating solutions 7 and 8 was Ebecryl 8807 (EB-8807), a UV-polymerizable monomer (available from Cytec Corporation, West Paterson N.J.). Samples 5-8 were UV curable and included 1% by weight of Esacure KB-1 photoinitiator in methylethyl ketone (available from Lamberti USA, Conshohocken Pa.).

For each coating solution, the solvent was either isopropyl alcohol (IPA) or methanol (MeOH). The mixing of the resin, the fumed silica, and the solvent was done in a 300 mL stainless steel beaker. The fumed silica was dispersed in the resin using a Ross 100-LC single stage high shear mixer with a single stage slotted head rotor (available from Charles Ross and Sons, Hauppauge N.Y.) for about 3 minutes at 1200 rpm. Next, the resulting foam was allowed to settle. Next, the solid weight percentage was adjusted to 12% by adding more of the same solvent resulting in coating solutions 1-9.

Next, a coating method was developed for each coating solution. First, the coating solution was coated on a PVC Vinyl organosol substrate (available as Geon 178 from PolyOne, Avon Lake Ohio) using a round wire-rod (available as a Meyer rod from RD Specialties, Webster N.Y.), where the size of the rod is specified in Table I. The wet coating thickness was dictated by the wire-rod number. A number 30 wire-rod resulted in a wet coating thickness of approximately 75.2 microns, and a number 15 wire-rod resulted in a wet coating thickness of approximately 38.1 microns.

Coated samples 1-4 and 9 were dried at room temperature for 25 minutes. Coated samples 5-8 were cured with UV radiation using a Fusion Systems Light Hammer UV system (available from Fusion Systems Inc, Gaithersburg, Md.) that was equipped with a 500 Watt H-bulb. The coatings were cured with a single exposure at 40 feet per minute (12.3 meters per minute) which corresponded to a UV-B dose of about 49 mille-joules per square cm.

TABLE I

Formulation and coating parameters for Example G

| Coating Solution # | Resin (wt-part = 1) | f-SiO$_2$ (wt-part) | Solvent | Coating Rod | Photo Initiator |
|---|---|---|---|---|---|
| 1 | FC2145 | 5 | MeOH | 30 | — |
| 2 | FC2145 | 5 | MeOH | 15 | — |
| 3 | SPU-5k | 5 | IPA | 30 | — |
| 4 | SPU-5k | 5 | IPA | 15 | — |
| 5 | SR-351 | 5 | IPA | 30 | 1% KB-1 |
| 6 | SR-351 | 5 | IPA | 15 | 1% KB-1 |
| 7 | EB-8807 | 5 | IPA | 30 | 1% KB-1 |
| 8 | EB-8807 | 5 | IPA | 15 | 1% KB-1 |
| 9 | FC2145 | 0 | MeOH | 30 | — |

Example H

A coating solution was made by mixing hydrophilic polyvinylalcohol (available as Poval PVA-235 from Kuraray America, Houston Tex.) and fumed silica (available as Cabo-O-Sperse PG022 from Cabot Corporation, Billerica Mass.). Next, 14.28 g of PVA-235 (7% wt solid in water) and 20 g of PG022 (20% wt in water), 0.25 g of Tergitol Min-Foam XL (available from Dow Chemical Company, Midland Mich.), 7.39 g of water, and 2.9 g of boric acid (5% wt in water) were mixed together and stirred in a beaker.

Next, the coating solution was applied on a 5 mil thick PET film using a number-30 wire-wound rod (available from RD Specialties, Webster, N.Y.). Next, the coated film was dried at 100° C. for 1 min.

Example I

First, a coating solution was made. In a 2 liter tree-neck flask, equipped with a condenser and a thermometer, 401.5 grams of Nalco 2327 silica particles, 11.9 grams of Trimethoxy (2,4,4 trimethypentyl) silane, 11.77 grams of (Triethoxysilyl) propionitrile, and 300 grams of 1-methoxy-2-propanol were mixed together and stirred. The flask was sealed and heated at 80° C. for 16 hours. Next, 100 grams of this solution and 30 grams of SR444 were added to a 250 milliliter round-bottom flask. The solvents in the solution were removed by rotary evaporation. Next, 10 grams of isopropanol was added to the flask. Next, 20 grams of 1-methoxy-2-propanol, 40 grams of isopropanol, 0.125 grams of Irgcure 819, and 1.25 grams of Irgcure 184 were added to the solution, resulting in a 30% by weight coating solution.

Example 1

Figure 12:
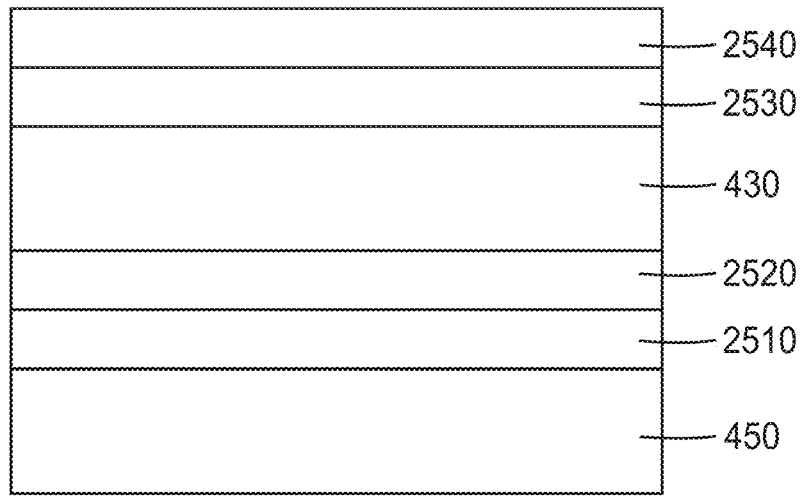
FIG. 12 is a schematic side-view of an optical construction.

A reference optical construction 2500, a side-view of which is shown schematically in FIG. 12, was made. First, volume diffuser 450 was made. A mixture was made that included: Polystyrene beads with an average diameter of about 6 microns (available as SBX-6 from Sekisui Plastics Co, Osaka, Japan) at 26% by weight, resin PH-6010 (available as Photomer 6010 from Cognis North America, Cincinnati Ohio) at 9% by weight, resins SR9003 at 4.6% by weight and SR833 at 4% by weight (both available from Sartomer Company, Exton Pa.), solvent Dowanol PM (available from Dow Chemical Company, Midland Mich.) at 60% by weight, and photoinitiator Darocur 4265 (available from Ciba Specialty Chemicals Company, High Point N.C.) at 0.4% by weight. The mixture was stirred in a high shear mixer with the beads added last to the mixture.

Next, 9w162 $TiO_2$ dispersion (available from Penn Color) at 2.6% wt was added to the above mixture. The resulting solution was then coated, dried and uv-cured to a dry thickness of about 39 microns on a 0.254 mm thick polyester (PET) film 2510. The resulting volume optical diffuser 450 had a total optical transmission of about 50%, an optical haze of about 100%, and a clarity of about 3%.

Next, the substrate side of the optical diffuser was laminated to a DBEF-Q reflective polarizer layer 430 (available as Vikuiti DBEF-Q from 3M Company, St. Paul, Minn.) via an optically clear adhesive 2520 (available as OCA 8171 from 3M Company, St. Paul Minn.). The optical adhesive has an index of refraction of about 1.48. Next, the other side of the reflective polarizer layer was laminated to a linear absorbing polarizer 2540 (available as SR5618 from San Ritz Corporation, Tokyo Japan). FIG. 12 shows the configuration of the resulting film stack.

The axial luminance ($cd/m^2$), integrated intensity ($lm/m^2$), and half brightness angles (degrees) in the up and down directions of the optical construction were measured using a Schott-Fostec-DCR light source (available from Schott-Fostec LLC, Auburn N.Y.) for illuminating the reference optical construction from the diffuser side, and an Autronic Conoscope Conostage 3 (available from Autronic-Melchers GmbH, Karlsruhe, Germany) for collecting data from the linear polarizer side. For comparison purposes, the measured axial luminance and integrated intensity values were set at 100% as summarized in Table II.

TABLE II

Measured optical properties for Examples 1-9

| Example No. | Axial Luminance (cd/m2) | Integrated Intensity (lm/m2) | Half Brightness Angle (Degrees) | |
|---|---|---|---|---|
| | | | Up | Down |
| 1 | 100% | 100% | 75 | 75 |
| 2 | 119% | 121% | 78 | 78 |

TABLE II-continued

Measured optical properties for Examples 1-9

| Example No. | Axial Luminance (cd/m2) | Integrated Intensity (lm/m2) | Half Brightness Angle (Degrees) | |
|---|---|---|---|---|
| | | | Up | Down |
| 3 | 137% | 138% | 75 | 75 |
| 4 | 131% | 132% | 75 | 75 |
| 5 | 128% | 129% | 78 | 78 |
| 6 | 130% | 131% | 75 | 75 |
| 7 | 126% | 128% | 78 | 78 |
| 8 | 147% | 150% | 75 | 75 |
| 9 | 148% | 151% | 75 | 75 |

Example 2

An optical construction was made that was similar to the optical construction made in Example 1, except that adhesive 2520 was a composition that included a polydiorganosiloxane polyoxamide containing silyloxy-containing repeat units and a tackifier (herein after referred to as silicone pressure sensitive adhesive (SPSA) for simplicity). The refractive index of the SPSA adhesive was 1.41. The measured optical properties are summarized in Table III. The axial luminance and integrated intensity values were normalized relative to the corresponding values measured in Example 1. The axial luminance of the optical construction in Example 2 was about 19% greater than the axial luminance of the optical construction in Example 1.

Example 3

Figure 13:
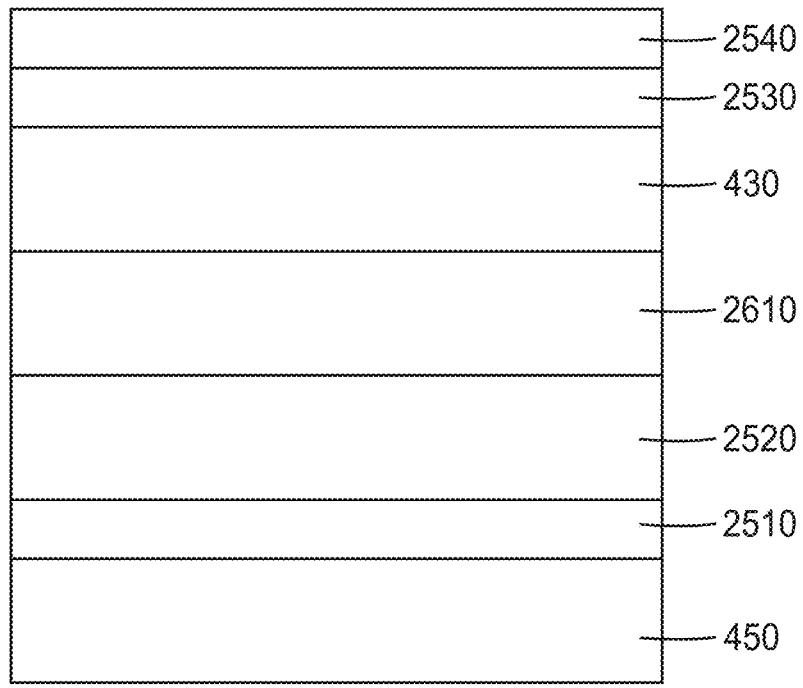
FIG. 13 is a schematic side-view of another optical construction.

An optical construction 2600, a side-view of which is shown schematically in FIG. 13, was made. Optical construction 2600 was similar to optical construction 2500, except that optical construction 2600 had an optical film 2610 placed between optical adhesive layer 2520 and reflective polarizer layer 430.

Volume optical diffuser 450 was made as described in Example 1. Next, coating solution A from Example A was coated on a DBEF-Q reflective polarizer layer 430 using the coating method described in Example E resulting in optical film 2610 coated on reflective polarizer layer 430. The optical film had an index of refraction of about 1.28 and a thickness of about 4 microns. Optical adhesive 2520 (OCA 8171 having an index of refraction 1.48) was used to laminate the substrate side of the volume diffuser to the optical film. SPSA optical adhesive layer 2530 was used to laminate the reflective polarizer to linear absorbing polarizer 2540, where the absorbing polarizer was similar to the absorbing polarizer used in Example 1.

The measured optical properties of optical construction 2600 are summarized in Table II. The axial luminance and integrated intensity values were normalized relative to the corresponding values measured in Example 1. The axial luminance of the optical construction in Example 3 was about 37% greater than the axial luminance of the optical construction in Example 1.

Example 4

An optical construction similar to Example 3 was made except that the LEDs were run at 6 Amps resulting in a UV-A dose of 0.174 joules per square cm. Optical film 2610 had an index of refraction of about 1.32 and a thickness of about 4 microns.

The measured optical properties of the optical construction are summarized in Table II. The axial luminance and integrated intensity values were normalized relative to the corresponding values measured in Example 1. The axial luminance of the optical construction in Example 4 was about 31% greater than the axial luminance of the optical construction in Example 1.

Example 5

An optical construction similar to Example 3 except that the syringe-pump rate was 2 cc/min. Optical film 2610 had an index of refraction of about 1.34 and a thickness of about 3 microns.

The measured optical properties of the optical construction are summarized in Table II. The axial luminance and integrated intensity values were normalized relative to the corresponding values measured in Example 1. The axial luminance of the optical construction in Example 5 was about 28% greater than the axial luminance of the optical construction in Example 1.

Example 6

An optical construction similar to Example 3 was made except that a different optical film 2610 was made. First, 10 g of Dyneon THV 200 (a fluoroplastic resin available as a 10% by weight solution in MEK from Dyneon LLC, Oakdale, Minn.) was mixed with 20 g of PTFE F-300 (a polytetrafluoroethylene non-porous low index micro-powder available from Micropowder Technologies, Tarrytown, N.Y.) in a 500 ml stainless steel beaker. The particles in the PTFE had an average diameter of about 5-6 microns, and about 95% of the particles had a diameter less than about 22 microns.

Next, an additional 100 g of MEK was added and the mixture was slowly agitated resulting in a mixture at 15% solids by weight in MEK. The weight ratio of THV to PTFE was approximately 1:2. Next, the mixture by weight THV-PTFE coating formulation at 15% solids MEK. The PTFE micropowder was further dispersed in the solution using a Ross 100-LC single stage high shear mixer (available from Charles Ross and Sons, Hauppaugne, N.Y.) that was equipped with a single stage slotted head rotor. The mixture was stirred for approximately 3 min at 1200 rpm. Next, fumed silica TS-530 (available as TS-530 from Cabot Corporation, Billerica Mass.) was added to the mixture resulting in a coating solution for making the optical film.

The coating solution was coated on DBEF-Q reflective polarizer using a hand-held knife coater set to a gap of about 102 microns. The wet coating was dried at room temperature for about 5 min and than further dried at 65 ° C. for 3 minutes. The dried coating had a thickness of about 4 microns and an index of refraction of about 1.35.

The measured optical properties of the optical construction are summarized in Table II. The axial luminance and integrated intensity values were normalized relative to the corresponding values measured in Example 1. The axial luminance of the optical construction in Example 6 was about 30% greater than the axial luminance of the optical construction in Example 1.

Example 7

An optical construction similar to Example 3 was made, except that a different optical film 2610 was made. First, a 10% by weight solution of SPU-5K (see, Example G) in 2-propanol was prepared. Next, SPU-5K, a silicone poly urea prepared as described in U.S. Pat. No. 6,355,759, Example 23, for which a masterbatch solution of this polymer was prepared as 10 wt % in 2-propanol. Next, fumed silica TS-530 was added to the solution resulting in a coating solution for making the optical film. The weight ration of SPU-5K to the fumed silica was about 1:5. Next, sufficient 2-propanol was added to the solution resulting in a coating solution at 12% solids by weight.

The resulting coating solution was coated on a DBEF-Q reflective polarizer layer 430 using a number 30 Meyer rod (available from RD Specialties, Webster N.Y.). The resulting wet coating thickness was approximately of 76.2 microns. The wet coating was dried at room temperature for about 5 min and than further dried at 65° C. for 3 min. The dried coating had a thickness of about 2.6 microns and an index of refraction of about 1.25.

The measured optical properties of the optical construction are summarized in Table II. The axial luminance and integrated intensity values were normalized relative to the corresponding values measured in Example 1. The axial luminance of the optical construction in Example 7 was about 26% greater than the axial luminance of the optical construction in Example 1.

Example 8

Figure 14:
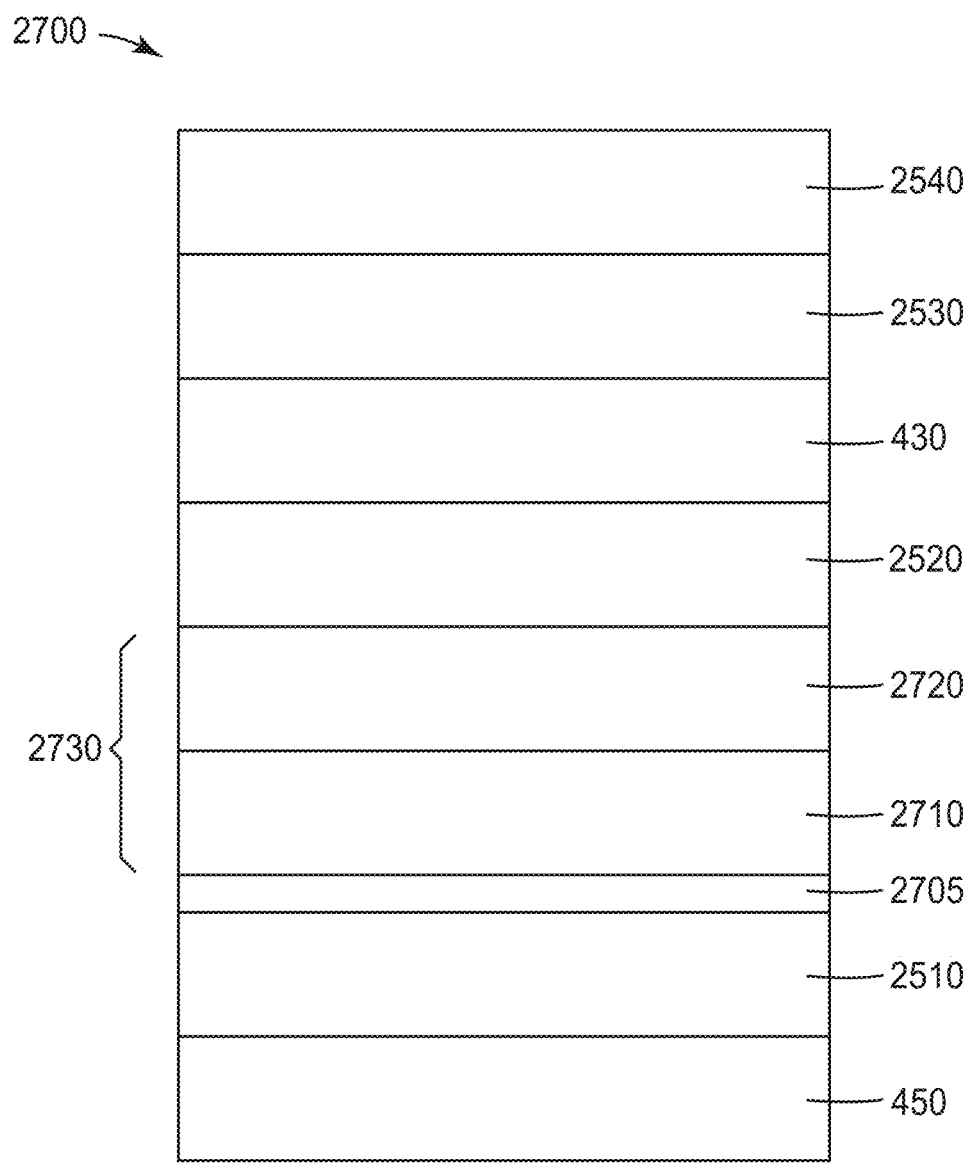
FIG. 14 is a schematic side-view of another optical construction.

An optical construction 2700, a side-view of which is schematically shown in FIG. 14, was made. Optical construction 2700 was similar to optical construction 2500 in FIG. 12, except that optical construction 2700 had an optical construction 2730 and an optical adhesive layer 2705 placed in between optical adhesive 2520 and substrate 2510. Optical construction 2730 included an optical film 2710 coated on a substrate 2720.

Volume optical diffuser 450 was coated on a PET substrate as described in Example 1. Next, coating solution B from Example B was coated on a 0.051 mm thick PET substrate 2720 using the coating method described in Example E except that the UV-LEDs were run at 6 Amps, resulting in a UV-A dose of 0.174 joules per square cm. The resulting optical film 2710 had an index of refraction of about 1.20 and a thickness of about 5 microns. Next, the PET side of the volume diffuser was laminated to optical film 2710 using optically clear adhesive OCA 8171 (layer 2705). SPSA optical adhesive layer 2520 was used to laminate PET substrate 2720 to reflective polarizer layer DBEF-Q 430. Next, SPSA optical adhesive layer 2530 was used to laminate the reflective polarizer to linear absorbing polarizer 2540, where the absorbing polarizer was similar to the absorbing polarizer used in Example 1.

The measured optical properties of the optical construction are summarized in Table II. The axial luminance and integrated intensity values were normalized relative to the corresponding values measured in Example 1. The axial luminance of the optical construction in Example 8 was about 47% greater than the axial luminance of the optical construction in Example 1.

Example 9

An optical construction similar to Example 8 was made except that the LEDs were run at 7 Amps, resulting in a UV-A dose of 0.195 joules per square cm. Optical film 2710 had an index of refraction of about 1.19 and a thickness of about 7 microns.

The measured optical properties of the optical construction are summarized in Table II. The axial luminance and integrated intensity values were normalized relative to the corresponding values measured in Example 1. The axial luminance of the optical construction in Example 9 was about 48% greater than the axial luminance of the optical construction in Example 1.

Example 10

An optical construction 2700, a side-view of which is schematically shown in FIG. 14, was made. Optical construction 2700 was similar to optical construction 2500 in FIG. 12, except that optical construction 2700 had an optical construction 2730 and an optical adhesive layer 2705 placed in between optical adhesive 2520 and substrate 2510. Optical construction 2730 included an optical film 2710 coated on a substrate 2720.

Volume optical diffuser 450 was coated on a PET substrate as described in Example 1. Next, a coating solution from Example H was coated on a 0.1275 mm thick PET substrate 2720 using a #30 wire-wound rod and dried at 100° C. for 1 min. The resulting optical film 2710 had an index of refraction of about 1.174, an optical haze of about 5%, and a thickness of about 5 microns. Next, the PET side of the volume diffuser was laminated to optical film 2710 using optically clear adhesive OCA 8171 (layer 2705). SPSA optical adhesive layer 2520 was used to laminate PET substrate 2720 to reflective polarizer layer DBEF-Q 430. Next, SPSA optical adhesive layer 2530 was used to laminate the reflective polarizer to linear absorbing polarizer 2540, where the absorbing polarizer was similar to the absorbing polarizer used in Example 1.

The axial luminance of the optical construction in Example 10 was about 43% greater than the axial luminance of the optical construction in Example 1.

Example 11

An optical construction 2700, a side-view of which is schematically shown in FIG. 14, was made. Optical construction 2700 was similar to optical construction 2500 in FIG. 12, except that optical construction 2700 had an optical construction 2730 and an optical adhesive layer 2705 placed in between optical adhesive 2520 and substrate 2510. Optical construction 2730 included an optical film 2710 coated on a substrate 2720.

Volume optical diffuser 450 was coated on a PET substrate as described in Example 1. Next, coating solution C from Example C was coated on a 0.051 mm thick PET substrate 2720 using the coating method described in Example E except that that the syringe-pump rate was 10 cc/min and the LEDs were run at 10 Amps resulting in a UV-A dose of 0.249 joules per square cm. The resulting film had an optical transmittance of about 92% transmission, an optical haze of about 5%, an optical clarity of about 99.7%, and a refractive index of about 1.15. Next, the PET side of the volume diffuser was laminated to optical film 2710 using optically clear adhesive OCA 8171 (layer 2705). SPSA optical adhesive layer 2520 was used to laminate PET substrate 2720 to reflective polarizer layer DBEF-Q 430. Next, SPSA optical adhesive layer 2530 was used to laminate the reflective polarizer to linear absorbing polarizer 2540, where the absorbing polarizer was similar to the absorbing polarizer used in Example 1. The axial luminance of the optical construction in Example 11 was about 52% greater than the axial luminance of the optical construction in Example 1.

Example 12

Figure 15:
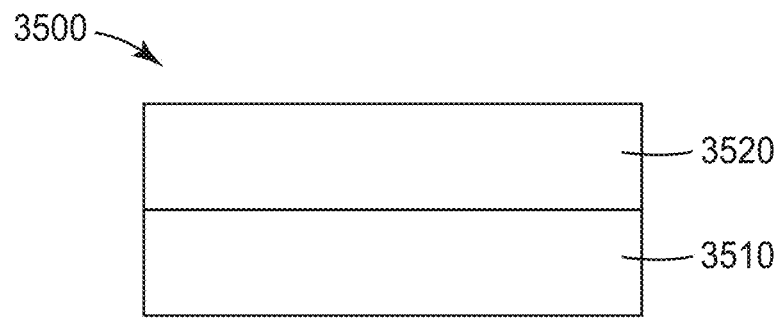
FIG. 15 is a schematic side-view of another optical construction.

Optical construction 3500, schematic side-view of which is shown in FIG. 15, was made. The optical construction included an optical film 3520 coated on a DBEF-Q reflecting polarizer layer (available from 3M Company, St. Paul Minn.). The coating solution from Example D was coated on DBEF using the coating method described in Example F except that the syringe-pump rate was 4.5 cc/min and the current to the LEDs was 13 Amps, resulting in a UV-A dose of 0.1352 joules per square cm. The resulting optical film 3520 had a refractive index of 1.17 and a thickness of about 6 microns.

Next, the PET side of the volume diffuser was laminated to optical film 3520 using optically clear adhesive OCA 8171. Next, SPSA optical adhesive layer 2530 was used to laminate the reflective polarizer to linear absorbing polarizer 2540, where the absorbing polarizer was similar to the absorbing polarizer used in Example 1. The axial luminance of the optical construction in Example 12 was about 50% greater than the axial luminance of the optical construction in Example 1.

Example 13

Figure 16:
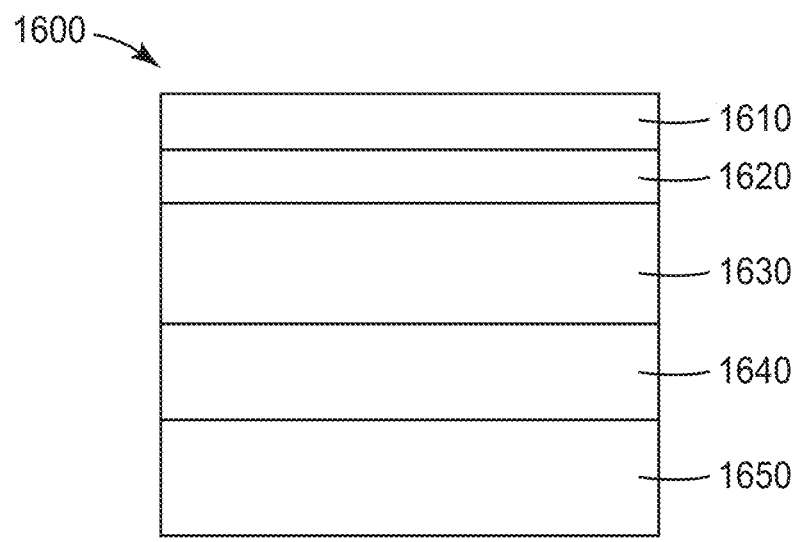
FIG. 16 is a schematic side-view of another optical construction.

Seven optical constructions 1600, schematic side-views of which are shown in FIG. 16, were made. Each optical construction 1600 included an optical film 1650 laminated to a DBEF-Q reflecting polarizer layer 1640 (available from 3M Company, St. Paul Minn.) via a first optical adhesive layer 1640 (available as OCA 8171 from 3M Company, St. Paul Minn. having an index of refraction of about 1.48). The other side of polarizer layer 1620 was laminated to a linear absorbing polarizer 1610 (available as SR5618 from San Ritz Corporation, Tokyo Japan) via a second optical adhesive layer 1620 (OCA 8171). Seven different optical films 1650 (labeled OF1-OF7) were selected:

Optical film 1 (OF1): An optically diffusive CELGARD 2500 available from Celanese Separation Products of Charlotte, N.C. OF1 was a porous film with 25 micron voids and a porosity of 55%. The thickness, optical haze, optical clarity, and photopic transmittance of sample OF1 are given in Table III.

Optical film 2 (OF2): A porous optically diffusive film made according to the teachings of U.S. Pat. Nos. 5,993,954 and 6,461,724. OF2 had a pore size in a range from about 100 nm to about 200 nm. The thickness, optical haze, optical clarity, and photopic transmittance of sample OF2 are given in Table III.

Optical film 3 (OF3): A TIPS optically diffusive porous film made according to the teachings of U.S. Pat. Nos. 4,539, 256; 4,726,989; and 5,238,623 and had a plurality of interconnected voids and a plurality of interconnected polymer filaments as exemplified in FIG. 7. OF3 was oriented and had elongated voids with a void diameter in a range from about 1 micron to about 2 microns. The polymer filaments had filament diameter in a range from about 0.1 microns to about 0.2 microns. The thickness, optical haze, optical clarity, and photopic transmittance of sample OF3 are given in Table III.

Optical film 4 (OF4): A porous optically diffusive oriented PET/polypropylene blend. The film composition was 69% PET, 30% PP, and 1% Hytrel G4074 compatibilizer (available from DuPont Engineering Polymers, Wilmington, Del.). The film was made on a standard polyester film making line. The starting components were blended in an extruder which fed a film making die. The cast web was then sequentially oriented using standard polyester film making process conditions. Typical pore size was in a range from about 5 microns to about 10 microns. The thickness, optical haze, optical clarity, and photopic transmittance of sample OF4 are given in Table III.

Optical film 5 (OF5): A porous PVDF film having a plurality of interconnected voids and a plurality of interconnected polymer filaments. The average pore size was about 12 microns. The pore size was in a range from about 5 microns to about 30 microns. The polymer filament diameter was in a range from about 1 micron to about 10 microns. The thickness, optical haze, optical clarity, and photopic transmittance of sample OF5 are given in Table III.

Optical film 6 (OF6): A non-porous optically diffusive ScotchCal 3635-70 (available from 3M Company, St. Paul, Minn.). OF6 was a vinyl film filled with $TiO_2$ pigment. The amount of $TiO_2$ pigment in the film was adjusted so that the transmission was about 50%. The thickness, optical haze, optical clarity, and photopic transmittance of sample OF6 are given in Table III.

Optical film 7 (OF7): A non-porous optically diffuser film having a plurality of polystyrene particles was made similar to volume diffuser 450 in Example 1. The thickness, optical haze, optical clarity, and photopic transmittance of sample OF7 are given in Table III.

TABLE III

Properties of optical films and constructions in Example 13

| Sample No. | Thickness (microns) | Optical Haze (%) | Optical Clarity (%) | Transmittance (%) | Optical Gain (%) |
|---|---|---|---|---|---|
| OF1 | 25 | 98.6 | 1.4 | 55 | 136 |
| OF2 | 25 | 98.2 | 2 | 50 | 134 |
| OF3 | 13 | 98.1 | 2.5 | 23 | 151 |
| OF4 | 85 | 98.3 | 2.5 | 39 | 126 |
| OF5 | 115 | 98.3 | 0 | 25 | 133 |
| OF6 | 50 | 98.5 | 2.3 | 50 | 106 |
| OF7 | 39 | 98.5 | 2 | 45 | 105 |

The gain for each optical construction 1600 was made. First, the optical transmittance $T_a$ of the construction was measured before laminating linear polarizer 1610 (that is, with an air layer between linear polarizer 1610 and reflective polarizer layer 1630). Next, the transmission $T_b$ of the optical construction was measured after the linear polarizer was laminated to the reflective polarizer layer using second optical adhesive layer 1620. The optical gain for each sample was the ration $T_b/T_a$. The optical gain values for the seven optical constructions 1600 are given in Table VI. Optical constructions that included porous optical films 1650 (that is, OF1-OF5) had significantly higher optical gains than optical constructions that included non-porous optical films (that is, OF6 and OF7). The porous optical films OF1-OF5 produced higher optical gains because these films had narrower scattering distributions inside the reflective polarizer layer as compared to the scattering distributions of optical films OF6 and OF7.

Example 14

The coating solution from Example I was coated according to Example F on a 2 mil (0.051 mm) thick PET substrate except that the syringe flow-rate was 6 cc/min and the current to the LEDs was at 13 Amps, resulting in a UV-A dose of 0.1352 joules per square cm. The resulting optical film had a total optical transmittance of about 52%, an optical haze of about 100%, an optical clarity of about 4%, and a thickness of about 8 microns.

An optical construction 3500, a schematic side-view of which is shown in FIG. 15, was made. The optical construction included an optical film 3520 coated on a DBEF-Q reflecting polarizer layer (available from 3M Company, St. Paul Minn.). The coating solution from Example I was coated on a DBEF-Q film using the coating method described in Example F except that the syringe-pump rate was 6 cc/min and the current to the LEDs was at 13 Amps, resulting in a UV-A dose of 0.1352 joules per square cm, resulting in a high haze optical film coated on DBEF-Q.

Next, SPSA optical adhesive layer 2530 was used to laminate the other side of the reflective polarizer to linear absorbing polarizer 2540, where the absorbing polarizer was similar to the absorbing polarizer used in Example 1. The axial luminance of the optical construction in Example 14 was about 43% greater than the axial luminance of the optical construction in Example 1.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if optical construction 100 in FIG. 1 is flipped as compared to the orientation in the figure, major surface 122 is still considered to be a "top" major surface.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical construction comprising:
a reflective polarizer layer; and
an optical film comprising a plurality of interconnected voids comprising surface voids and interior voids, the optical film disposed on the reflective polarizer layer and having an optical haze that is not less than about 40%, and an optical clarity that is not less than about 80%, wherein substantial portions of each two neighboring major surfaces in the optical construction are in physical contact with each other.

2. The optical construction of claim 1, wherein the optical film has an effective index of refraction that is less than about 1.4.

3. The optical construction of claim 1, wherein the optical film has an optical clarity that is not less than about 90%.

4. The optical construction of claim 1, wherein the optical film has a thickness that is not less than about 500 nm.

5. The optical film of claim 4, wherein the optical film has a thickness that is not less than about 700 nm.

6. The optical film of claim 5, wherein the optical film has a thickness that is not less than about 1 micron.

7. The optical construction of claim 1, wherein the optical film comprises:
   a binder;
   a plurality of interconnected voids comprising surface voids and interior voids; and
   a plurality of particles.

8. The optical construction of claim 1, wherein at least 90% of each two neighboring major surfaces of the optical construction are in physical contact with each other.

9. The optical construction of claim 1, wherein the optical film is coated on the reflective polarizer layer.

10. The optical construction of claim 1, wherein the reflective polarizer layer comprises a multilayer optical film comprising alternating layers, wherein at least one of the alternating layers comprises a birefringent material.

11. An optical construction comprising:
   a substrate layer; and
   an optical film comprising a plurality of interconnected voids comprising surface voids and interior voids, the optical film disposed on the substrate layer and having an optical haze that is not less than about 70%, an optical clarity that is not less than about 90%, and an effective index of refraction that is not greater than about 1.4, wherein substantial portions of each two neighboring major surfaces in the optical construction are in physical contact with each other.

12. The optical construction of claim 11, wherein the substrate layer is polyethylene terephthalate.

13. The optical construction of claim 11, wherein the optical film has an optical haze that is not less than about 80%.

14. The optical construction of claim 11, wherein the optical film has an optical clarity that is not less than about 95%.

15. The optical film of claim 11, wherein the optical film has a thickness that is not less than about 1 micron.

16. The optical film of claim 15, wherein the optical film has a thickness that is not less than about 2 micron.

17. The optical construction of claim 11, wherein the optical film comprises:
   a binder;
   a plurality of interconnected voids comprising surface voids and interior voids; and
   a plurality of particles.

18. The optical construction of claim 11, wherein the optical film is coated on the substrate.

* * * * *